(12) United States Patent
Iwano et al.

(10) Patent No.: US 9,091,325 B2
(45) Date of Patent: *Jul. 28, 2015

(54) COATING LIQUID FOR COVERING GLASS FIBER AND RUBBER-REINFORCING GLASS FIBER USING SAME

(71) Applicant: Central Glass Company, Ltd., Ube-shi, Yamaguchi (JP)

(72) Inventors: Takafumi Iwano, Matsusaka (JP); Katsuhiko Ogaki, Matsusaka (JP); Minekazu Kohama, Matsusaka (JP); Kazuhiro Yamamoto, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 52 days.

This patent is subject to a terminal disclaimer.

(21) Appl. No.: 13/790,928

(22) Filed: Mar. 8, 2013

(65) Prior Publication Data

US 2013/0231207 A1    Sep. 5, 2013

Related U.S. Application Data

(63) Continuation-in-part of application No. 11/664,114, filed as application No. PCT/JP2005/017725 on Sep. 27, 2005, now Pat. No. 8,455,097.

(30) Foreign Application Priority Data

| | | |
|---|---|---|
| Oct. 1, 2004 | (JP) | 2004-290183 |
| Sep. 2, 2005 | (JP) | 2005-254242 |
| Sep. 2, 2005 | (JP) | 2005-254243 |
| Sep. 2, 2005 | (JP) | 2005-254244 |
| Sep. 2, 2005 | (JP) | 2005-254245 |

(51) Int. Cl.
| | |
|---|---|
| *B32B 9/00* | (2006.01) |
| *F16G 1/10* | (2006.01) |
| *C09D 161/06* | (2006.01) |
| *C09D 139/08* | (2006.01) |
| *C09D 123/28* | (2006.01) |
| *C09D 133/20* | (2006.01) |
| *C03C 25/34* | (2006.01) |
| *C03C 25/10* | (2006.01) |
| *C03C 25/26* | (2006.01) |
| *C08L 61/06* | (2006.01) |
| *C09D 133/18* | (2006.01) |

(52) U.S. Cl.
CPC .............. *F16G 1/10* (2013.01); *C03C 25/1015* (2013.01); *C03C 25/26* (2013.01); *C03C 25/34* (2013.01); *C08L 61/06* (2013.01); *C09D 123/28* (2013.01); *C09D 133/18* (2013.01); *C09D 133/20* (2013.01); *C09D 139/08* (2013.01); *C09D 161/06* (2013.01); *Y10T 428/2964* (2015.01); *Y10T 428/2967* (2015.01)

(58) Field of Classification Search
CPC ....... C08L 23/26; C08L 23/28; C08L 23/286; C08L 23/32; C08L 23/34; C08L 25/04; C08L 25/10; C08L 25/12; C08L 39/08; C08L 55/02; C08L 61/04; C08L 61/06; C08L 2205/02; C08L 33/18; C08L 33/20; C08K 5/00; C08K 5/005; C08K 7/04; C08K 7/14; F16G 1/08; F16G 1/10; F16G 1/06; C03C 25/00; C03C 25/10; C03C 25/1015; C03C 25/16; C03C 25/24; C03C 25/48; C03C 25/34; B32B 5/001; B32B 5/02; B32B 2260/04; B32B 2260/048; B32B 2260/00; B32B 2262/101; B32B 2255/02; B32B 177/04; B32B 25/00; B32B 25/02; B32B 25/10; B32B 25/14; B32B 27/00; B32B 27/04; B32B 27/12; B32B 27/32; B32B 27/42; B32B 27/302; B32B 27/322; C09D 109/02; C09D 109/04; C09D 109/06; C09D 109/08; C09D 109/00; C09D 109/10; C09D 115/02; C09D 125/08; C09D 125/10; C09D 125/12; C09D 155/02; C09D 139/08; C09D 133/18; C09D 133/20; C09D 153/02; C09D 161/00; C09D 161/04; C09D 161/06; D06M 15/19; D06M 15/195; D06M 15/227; D06M 15/233; D06M 15/244; D06M 15/248; D06M 15/41; D06M 15/39; D06M 15/693; D06M 2101/00
USPC ................... 428/375, 378, 392, 390
See application file for complete search history.

(56) References Cited

U.S. PATENT DOCUMENTS

| | | |
|---|---|---|
| 3,410,818 A | 11/1968 | Yurcick et al. |
| 3,660,202 A | 5/1972 | Edington et al. |
| 3,843,484 A | 10/1974 | Kamiyoshi et al. |
| 3,843,575 A | 10/1974 | Dijkstra |
| 4,366,303 A | 12/1982 | Kopf |
| 4,636,550 A | 1/1987 | Wolff et al. |
| 6,262,154 B1 | 7/2001 | Okamura et al. |
| 6,495,625 B1 | 12/2002 | Abe et al. |
| 6,875,509 B2 | 4/2005 | Ando |
| 7,128,971 B2 | 10/2006 | Hyakutake et al. |
| 8,455,097 B2 * | 6/2013 | Monden et al. ............ 428/392 |
| 2004/0033356 A1 | 2/2004 | Ando et al. |
| 2004/0087733 A1 | 5/2004 | Nishihata et al. |
| 2004/0229999 A1 | 11/2004 | Achten et al. |
| 2005/0003186 A1 | 1/2005 | Ando |
| 2005/0129943 A1 | 6/2005 | Ando |
| 2009/0137355 A1 | 5/2009 | Ogaki et al. |
| 2013/0231207 A1 * | 9/2013 | Iwano et al. ............ 474/263 |

FOREIGN PATENT DOCUMENTS

| | | |
|---|---|---|
| EP | 1 440 999 A1 | 7/2004 |
| JP | 48-17878 | 3/1973 |
| JP | 2-4715 B2 | 1/1990 |
| JP | 4-126877 A | 4/1992 |
| JP | 7-11012 A | 1/1995 |
| JP | 10-25665 A | 1/1998 |
| JP | 11-343472 A | 12/1999 |
| JP | 3201330 B2 | 8/2001 |
| JP | 3201331 B2 | 8/2001 |
| JP | 2003-306874 A | 10/2003 |
| JP | 2004-203730 A | 7/2004 |
| JP | 2004-244785 A | 9/2004 |
| JP | 2006-104595 A | 4/2006 |
| JP | 2007-63726 A | 3/2007 |
| JP | 2007-63727 A | 3/2007 |
| JP | 2008-133553 A | 6/2008 |
| JP | 2010-7196 A | 1/2010 |
| JP | 2010-138535 A | 6/2010 |
| JP | 2010-222178 A | 10/2010 |
| JP | 2010-222179 A | 10/2010 |
| JP | 2010-222180 A | 10/2010 |
| JP | 2012-26067 A | 2/2012 |
| JP | 2012-67410 A | 4/2012 |
| JP | 2012-67411 A | 4/2012 |
| JP | 2012-67412 A | 4/2012 |

OTHER PUBLICATIONS

"Bis-allyl-nadi-imide (BANI)", Product Data Sheet, 1997, Chemiway, Maruzen Petrochemical Co., Ltd. (Three (3) pages).

* cited by examiner

*Primary Examiner* — Jill Gray

(74) *Attorney, Agent, or Firm* — Crowell & Moring LLP

(57) ABSTRACT

There is disclosed a glass-fiber coating liquid for forming a coating layer on a glass fiber cord, prepared in the form of an emulsion consisting essentially of a monohydroxybenzene-formaldehyde resin (A) obtained by reaction of monohydroxybenzene (D) and formaldehyde (E), a vinylpyridine-styrene-butadiene copolymer (B) having a vinylpyridine monomer content of 17 to 35% by mass, a styrene monomer content of 20 to 40% by mass and a butadiene monomer content of 35 to 60% by mass, a chlorosulfonated polyethylene (C), an acrylonitrile-butadiene rubber (P); at least one of an antioxidant, a pH adjuster and a stabilizer; and water.

10 Claims, 4 Drawing Sheets

COATING LIQUID FOR COVERING GLASS FIBER AND RUBBER-REINFORCING GLASS FIBER USING SAME

TECHNICAL FIELD

The present invention relates to a glass-fiber coating liquid for forming a coating layer on a glass fiber usable as a reinforcement in various rubber products, so as to enhance adhesion of the glass fiber to a base rubber material, and also relates to a rubber-reinforcing glass fiber using the coating liquid.

BACKGROUND OF THE INVENTION

In order to provide a rubber product such as a transmission belt or a tire with tensile strength and dimensional stability, it is common practice to embed a high-strength fiber e.g. a glass fiber, a nylon fiber or a polyester fiber as a reinforcement in a base rubber of the rubber product. The rubber-reinforcing fiber, for use as the reinforcement embedded in the base rubber, needs to have good adhesion to the base rubber to define a tight interface between the rubber-reinforcing fiber and the base rubber and prevent separation of the rubber-reinforcing fiber from the base rubber. The glass fiber itself cannot however be adhered to the base rubber and, even if adhered, shows such weak adhesion as to cause interfacial separation between the glass fiber and the base rubber and fail to function properly as the reinforcement.

There is accordingly often used in e.g. the transmission belt a rubber-reinforcing glass fiber produced by preparing a glass-fiber coating liquid in which a resorcinol-formaldehyde resin and various latex components are dispersed in water, and then, applying and drying a coating layer of the glass-fiber coating liquid onto a glass fiber cord of filament yarn, so as to enhance adhesion between the glass fiber and the base rubber and prevent interfacial separation of the glass fiber from the base rubber. The coating layer has the effect of adhering the glass fiber to the base rubber when the rubber-reinforcing glass fiber is embedded in the base rubber and formed into the transmission belt under high-temperature conditions, but the strength of adhesion between the glass fiber and the base rubber is not always sufficient. For example, a heat-resistant rubber such as hydrogenated nitrile rubber (hereinafter abbreviated as "HNBR") is employed as the base rubber of the automotive transmission belt for use in a high-temperature engine room environment. In the case where the rubber-reinforcing glass fiber is treated only with the above coating process and embedded in the heat-resistant base rubber, however, the transmission belt cannot maintain adhesion strength between the rubber-reinforcing glass fiber and the base rubber during running where the transmission belt is continuously bent under high-temperature conditions. This can result in the occurrence of interfacial separation between the rubber-reinforcing glass fiber and the base rubber during long hours of running.

In view of the foregoing, Patent Documents 1 to 6 propose the production of rubber-reinforcing glass fibers for use in transmission belts, by performing the above coating process to form primary coating layers on glass fiber cords and applying and drying secondary coating liquids of different compositions to form secondary coating layers on the primary coating layers, such that the transmission belts become able to maintain adhesion of the rubber-reinforcing glass fibers to cross-linked HNBR belt materials, without causing interfacial separation between the rubber-reinforcing glass fibers and the cross-linked HNBR materials, and to secure long-term reliability even under high-temperature running conditions More specifically, Patent Document 1 discloses a coating treatment technique that uses a secondary coating liquid containing a halogen-containing polymer and an isocyanate.

Patent Document 2 discloses a rubber-reinforcing glass fiber cord produced by applying, drying and curing onto a rubber-reinforcing glass fiber a primary coating of treatment liquid containing a resorcinol-formaldehyde condensate and a rubber latex, and then, applying drying and curing a secondary coating of different treatment liquid onto the primary coating, wherein the secondary coating treatment liquid contains as main components a rubber-blended material, a vulcanization agent and a maleimide-based vulcanization accelerator.

Patent Document 3 discloses a rubber-reinforcing glass fiber cord produced by applying, drying and curing onto a rubber-reinforcing glass fiber a primary coating of treatment liquid containing a resorcinol-formaldehyde condensate and a rubber latex, and then, applying drying and curing a secondary coating of different treatment liquid onto the primary coating, wherein the secondary coating treatment liquid contains as main components a rubber-blended material, a vulcanization agent and a dimethacrylate-based vulcanization accelerator and the rubber-blended material is a mixed rubber solution of a hydrogenated nitrile rubber and a hydrogenated nitrile rubber in which zinc methacrylate is dispersed.

Patent Document 4 discloses a rubber-reinforcing fiber treatment liquid containing a rubber latex, a water-soluble resorcinol-formaldehyde condensate and a triazinethiol.

Patent Document 5, filed by the present applicant, discloses a rubber-reinforcing glass fiber material produced by applying and drying onto a glass fiber a coating of emulsified glass-fiber coating liquid in which an acrylic ester resin, a vinylpyridine-styrene-butadiene copolymer and a resorcinol-formaldehyde resin are dispersed in water, and then, applying another coating of glass-fiber coating liquid in which a halogen-containing polymer and 0.3 to 10.0% by mass of a bis-allylnagiimide, with respect to the mass of the halogen-containing polymer, are dispersed in an organic solvent. This rubber-reinforcing glass fiber material has been proven to show good adhesion to HNBR.

Patent Document 6, filed by the present applicant, discloses a rubber-reinforcing glass fiber material produced by applying, drying and curing onto a glass fiber a primary coating of glass-fiber coating liquid in which a resorcinol-formaldehyde resin and a rubber latex are dispersed in water, and then, applying, drying and curing onto the primary coating a secondary coating of different glass-fiber coating liquid in which a bis-allylnagiimide, a rubber elastomer, a vulcanization agent and an inorganic filler are dispersed in an organic solvent. This rubber-reinforcing glass fiber material has also been proven to show good adhesion to HNBR and, when embedded in HNBR for use as the reinforcement in the transmission belt, show high heat resistance without a deterioration in tensile strength even after long hours of running under high-temperature conditions.

As discussed above, the conventional heat-resistant transmission belt is produced by applying and drying the glass-fiber coating liquid of resorcinol-formaldehyde resin, vinylpyridine-styrene-butadiene copolymer and chlorosulfonated polyethylene onto the glass fiber cord and embedding the resulting rubber-reinforcing glass fiber in the heat-resistant HNBR material. Further, the rubber-reinforcing glass fiber is generally provided with the secondary coating layer before embedded in the heat-resistant HNBR material.

PRIOR ART DOCUMENTS

Patent Document 1: Japanese Examined Patent Publication No. 2-4715
Patent Document 2: Japanese Patent No. 3201330
Patent Document 3: Japanese Patent No. 3201331
Patent Document 4: Japanese Laid-Open Patent Publication No. 10-25665
Patent Document 5: Japanese Laid-Open Patent Publication No. 2004-203730
Patent Document 6: Japanese Laid-Open Patent Publication No. 2004-244785

SUMMARY OF THE INVENTION

For use of the rubber-reinforcing glass fiber as the reinforcement embedded in the base rubber of the transmission belt, the coating is applied to the glass fiber cord to enhance adhesion between the rubber-reinforcing glass fiber and the base rubber.

The above conventional transmission belt secures initial strength of adhesion between the rubber-reinforcing coated glass fiber cord and the base rubber, but does not maintain initial tensile strength without changes in dimension even after long hours of running under high-temperature high-humidity conditions and does not combine high water resistance, high heat resistance and high oil resistance.

It is required that the transmission belt, for automotive use, is capable of withstanding exposure to engine heat and rainy weather. In other words, the transmission belt needs to have both of heat resistance and water resistance so as to show good dimensional stability and maintain tensile strength after long hours of running under high-temperature high-humidity conditions. The transmission belt also needs to have oil resistance for operation in the presence of a lubricating oil.

There has thus been awaited the development of a rubber-reinforcing glass fiber for a transmission belt, having a glass fiber cord covered with a coating layer to show equal or higher adhesion strength to the heat-resistant rubber material and attain heat resistance, water resistance and oil resistance to maintain initial adhesion strength between the glass fiber and the rubber after long hours of running under high-temperature high-humidity conditions and in the presence of a lubricating oil, as compared to the conventional transmission belt produced by embedding either of the rubber-reinforcing glass fibers of Patent Documents 1 to 6 in the heat-resistant rubber.

As a result of extensive researches, the present inventors have found that, in the case of using a glass-fiber coating liquid that contains a vinylpyridine-styrene-butadiene copolymer, a chlorosulfonated polyethylene and a monohydroxybenzene-formaldehyde resin for the production of a rubber-reinforcing glass fiber, it becomes possible for the rubber-reinforcing glass fiber to achieve not only high water resistance and high heat resistance but also high oil resistances and thereby secure tensile strength and dimensional stability even after long hours of running by adding an acrylonitrile-butadiene rubber to the glass-fiber coating liquid and controlling the monomer contents of the vinylpyridine-styrene-butadiene copolymer to within specific ranges.

Namely, there is provided according to one aspect of the present invention a glass-fiber coating liquid for forming a coating layer on a glass fiber cord, prepared in the form of an emulsion consisting essentially of: a monohydroxybenzene-formaldehyde resin (A) obtained by reaction of monohydroxybenzene (D) and formaldehyde (E); a vinylpyridine-styrene-butadiene copolymer (B) having a vinylpyridine monomer content of 17 to 35% by mass, a styrene monomer content of 20 to 40% by mass and a butadiene monomer content of 35 to 60% by mass; a chlorosulfonated polyethylene (C); an acrylonitrile-butadiene rubber (P); at least one additive selected from the group consisting of an antioxidant, a pH adjuster and a stabilizer; and water.

There is provided another aspect of the present invention a glass-fiber coating liquid for forming a coating layer on a glass fiber cord, prepared in the form of an emulsion consisting essentially of: a monohydroxybenzene-formaldehyde resin (A) obtained by reaction of monohydroxybenzene (D) and formaldehyde (E); a vinylpyridine-styrene-butadiene copolymer (B) having a vinylpyridine monomer content of 17 to 35% by mass, a styrene monomer content of 20 to 40% by mass and a butadiene monomer content of 35 to 60% by mass; a chlorosulfonated polyethylene (C); an acrylonitrile-butadiene rubber (P); a styrene-butadiene copolymer (F); at least one additive selected from the group consisting of an antioxidant, a pH adjuster and a stabilizer; and water.

There is provided according to still another aspect of the present invention a rubber-reinforcing glass fiber comprising: a glass fiber cord; a primary coating layer formed by applying and drying the above-mentioned glass-fiber coating liquid on the glass fiber cord; and a secondary coating layer formed by applying a secondary glass-fiber coating liquid on the primary coating layer.

DETAILED DESCRIPTION OF THE EMBODIMENTS

Figure 1:
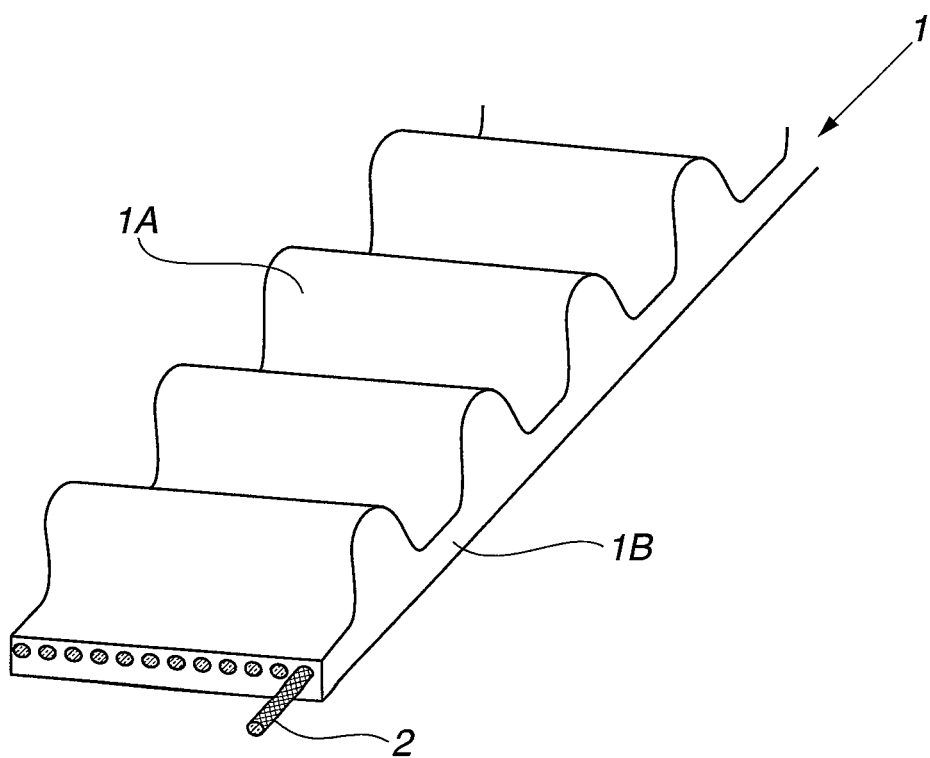
FIG. 1 is a perspective sectional view of a transmission belt produced by embedding a rubber-reinforcing glass fiber in a heat-resistant rubber.

A rubber-reinforcing glass fiber in which a glass-fiber coating liquid of the present invention is applied to form a coating layer on a glass fiber cord shows, when embedded in a heat-resistant rubber material such as HNBR cross-linked with sulfur or peroxide, good adhesion to the cross-linked HNBR material. Further, a transmission belt in which the above rubber-reinforcing glass fiber is embedded in the cross-linked HNBR material combines heat resistance, water resistance and oil resistance to ensure good dimensional stability and maintain tensile strength, without the possibility of interfacial separation between the glass fiber and the heat-resistant rubber material, even after long hours of use i.e. running under high-temperature high-humidity conditions in the presence of a lubricating oil.

The glass-fiber coating liquid of the present invention is prepared by dispersing a monohydroxybenzene-formaldehyde resin (A) as a phenol resin, a vinylpyridine-styrene-butadiene copolymer (B), a chlorosulfonated polyethylene (C) and an acrylonitrile-butadiene rubber (P) into water and is then applied and dried onto the glass fiber cord. The thus-formed coating layer is supposed to have the function of preventing water penetration into the glass fiber cord. Another glass-fiber coating liquid is applied and dried to form a secondary coating layer on the above coating layer.

As compared to conventional rubber-reinforcing glass fibers, the rubber-reinforcing glass fiber of the present invention is capable of protecting the glass fiber cord from water/oil penetration and, when embedded in the heat-resistant rubber material such as cross-linked HNBR for use as the transmission belt, imparting not only high heat resistance but also high water resistance and oil resistance to the transmission belt.

In the present invention, the dispersion system of the monohydroxybenzene-formaldehyde resin (A), the vinylpyridine-styrene-butadiene copolymer (B), the chlorosulfonated polyethylene (C), the acrylonitrile-butadiene rubber (P) and water is used as the glass-fiber coating liquid to form the primary coating layer on the glass fiber cord as mentioned above.

Herein, the transmission belt refers to a power transmission belt for driving an engine or another machinery device from a power source such as engine or motor. Examples of the transmission belt are a synchronous belt that allows power transmission by mesh gearing and a V belt that allows power transmission by friction gearing. The automotive transmission belt is one type of heat-resistant transmission belt used in an automotive engine room and exemplified as a timing belt having teeth in mesh with pulley teeth to transmit a crankshaft rotation to a timing gear and thereby drive an engine camshaft for valve open/close timing control.

As the monohydroxybenzene-formaldehyde resin (A) of the glass-fiber coating liquid of the present invention, a water-soluble or water-solvent resol resin obtained by reacting monohydroxybenzene (D) with formaldehyde (E) at a mole ratio of the formaldehyde (E) to the monohydroxybenzene (D) of 0.5 to 3.0, i.e., E/D=0.5 to 3.0 in the presence of a base catalyst is usable. If the mole ratio of the formaldehyde (E) to the monohydroxybenzene (D) is less than 0.5, the adhesion between the rubber-reinforcing glass fiber and the heat-resistant rubber becomes weak. If the mole ratio of the formaldehyde (E) to the monohydroxybenzene (D) exceeds 0.3, the glass-fiber coating liquid becomes prone to gelation. The mole ratio E/D is preferably within the range of 0.3 to 1.2.

An example of the monohydroxybenzene-formaldehyde resin (A) suitable for use in the glass-fiber coating liquid of the present invention is a phenol resin commercially available under the trade name of Resitop PL-4667 from Gun Ei Chemical Industry Co., Ltd.

The base catalyst can be either lithium hydroxide, sodium hydroxide, potassium hydroxide, magnesium hydroxide, calcium hydroxide or barium hydroxide.

As the vinylpyridine-styrene-butadiene copolymer (B) of the glass-fiber coating liquid of the present invention, a copolymer of vinylpyridine, styrene and butadiene having a vinylpyridine monomer content of 17 to 35% by mass, a styrene monomer content of 20 to 40% by mass and a butadiene monomer content of 35 to 60% by mass is used in the present invention. Examples of the vinylpyridine-styrene-butadiene copolymer (B) suitable for use in the glass-fiber coating liquid of the present invention are those commercially available under the trade name of Pyratex LB (solid content: 41 mass %) from Nippon A&L Inc., under the trade name of 0650 from JSR Corporation and under the trade name of Nipol 1218FS from Nippon Zeon Corporation.

As the chlorosulfonated polyethylene (C) of the glass-fiber coating liquid of the present invention, a chlorosulfonated polyethylene having a chlorine content of 20.0 to 40.0% by mass and a sulfone sulfur content of 0.5 to 2.0% by mass is preferably usable. An example of the chlorosulfonated polyethylene (C) suitable for use in the glass-fiber coating liquid is the one commercially available as a latex having a solid content of about 40% by mass under the trade name of CSM-450 from Sumitomo Seika Chemicals Co., Ltd. In the case where the chlorine and sulfone sulfur contents of the chlorosulfonated polyethylene (C) are out of the above-specified ranges, the rubber-reinforcing glass fiber shows relatively weak adhesion to the cross-linked HNBR base material even when the glass-fiber coating liquid is applied and dried onto the glass fiber cord.

Examples of the acrylonitrile-butadiene rubber (P) suitable for use in the glass-fiber coating liquid of the present invention are those commercially available under the trade name of Nipol L1560 and Nipol L1562 (solid content: 41 mass %) from Nippon Zeon Corporation.

In order to achieve a desired strength of adhesion between the rubber-reinforcing glass fiber and the base rubber material for use in the transmission belt, it is desirable that the glass-fiber coating liquid contains 3 to 8% by mass of the monohydroxybenzene-formaldehyde resin (A), 30 to 60% by mass of the vinylpyridine-styrene-butadiene copolymer (B), 8 to 15% by mass of the chlorosulfonated polyethylene (C) and 25 to 60% by mass of the acrylonitrile-butadiene rubber (P) assuming the total mass of the monohydroxybenzene-formaldehyde resin (A), the vinylpyridine-styrene-butadiene copolymer (B), the chlorosulfonated polyethylene (C) and the acrylonitrile-butadiene rubber (P) as 100%, i.e., the component mass percentages A/(A+B+C+P), B/(A+B+C+P), C/(A+B+C+P) and P/(A+B+C+P) are within the range of 3 to 8%, 30 to 60%, 8 to 15% and 25 to 60%, respectively.

If the content of the monohydroxybenzene-formaldehyde resin (A) in the glass-fiber coating liquid is less than 3%, the application of such a coating liquid to the glass fiber cord results in weak adhesion between the glass fiber and the base rubber so that it is difficult to provide the transmission belt with suitable water resistance, heat resistance and oil resistance. If the content of the monohydroxybenzene-formaldehyde resin (A) in the glass-fiber coating liquid exceeds 8%, it is likely that the coating liquid will become unusable due to coagulation and precipitation. For this reason, the content of the monohydroxybenzene-formaldehyde resin (A) in the glass-fiber coating liquid is preferably within the range of A/(A+B+C+P)=3 to 8% by mass, more preferably 4 to 7% by mass, assuming the total mass of the monohydroxybenzene-formaldehyde resin (A), the vinylpyridine-styrene-butadiene copolymer (B), the chlorosulfonated polyethylene (C) and the acrylonitrile-butadiene rubber (P) as 100%.

If the content of the vinylpyridine-styrene-butadiene copolymer (B) in the glass-fiber coating liquid is less than 30%, it is difficult to impart a desired level of water resistance for bending and running of the transmission belt. If the content of the vinylpyridine-styrene-butadiene copolymer (B) in the glass-fiber coating liquid exceeds 60%, it is difficult to impart a desired level of oil resistance for bending and running of the transmission belt. The content of the vinylpyridine-styrene-butadiene copolymer (B) in the glass-fiber coating liquid is thus preferably within the range of B/(A+B+C+P)=30 to 60% by mass, more preferably 33 to 57% by mass, assuming the total mass of the monohydroxybenzene-formaldehyde resin (A), the vinylpyridine-styrene-butadiene copolymer (B), the chlorosulfonated polyethylene (C) and the acrylonitrile-butadiene rubber (P) as 100%.

If the content of the chlorosulfonated polyethylene (C) in the glass-fiber coating liquid is less than 8%, it becomes difficult to impart a desired level of heat resistance to the transmission belt. If the content of the chlorosulfonated polyethylene (C) in the glass-fiber coating liquid exceeds 15%, the adhesion between the glass fiber and the base rubber becomes weak so that it is difficult to provide the transmission belt with suitable heat resistance. The content of the chlorosulfonated polyethylene (C) in the glass-fiber coating liquid is thus preferably within the range of C/(A+B+C+P)=8 to 15% by mass, more preferably 9 to 13% by mass, assuming the total mass of the monohydroxybenzene-formaldehyde resin (A), the vinylpyridine-styrene-butadiene copolymer (B), the chlorosulfonated polyethylene (C) and the acrylonitrile-butadiene rubber (P) as 100%.

If the content of the acrylonitrile-butadiene rubber (P) in the glass-fiber coating liquid is less than 25%, the adhesion between the glass fiber and the base rubber becomes so weak that it is difficult to provide the transmission belt with suitable heat resistance. If the content of the acrylonitrile-butadiene rubber (P) in the glass-fiber coating liquid exceeds than 60%, the transmission belt deteriorates in heat resistance. The content of the acrylonitrile-butadiene rubber (P) in the glass-fiber coating liquid is thus preferably within the range of P/(A+B+C+P)=25 to 60% by mass, more preferably 27 to 55% by mass, assuming the total mass of the monohydroxybenzene-formaldehyde resin (A), the vinylpyridine-styrene-butadiene copolymer (B), the chlorosulfonated polyethylene (C) and the acrylonitrile-butadiene rubber (P) as 100%.

In the present invention, another rubber elastomer may be used in place of a part of the vinylpyridine-styrene-butadiene copolymer (B) as the component of the glass-fiber coating liquid used in the rubber-reinforcing glass fiber. When the vinylpyridine-styrene-butadiene copolymer is used alone as the coating liquid component, it becomes likely that the rubber-reinforcing glass fiber will undergo transfer of the coating layer due to coating stickiness and raise workability deterioration problems such as process contamination. Examples of such a rubber elastomer are a carboxyl-modified styrene-butadiene rubber and a styrene-butadiene copolymer (F). Among others, the styrene-butadiene copolymer (F) is preferred because the styrene-butadiene copolymer (F) is compatible with the vinylpyridine-styrene-butadiene copolymer (B) and does not cause impairments of the adhesion between the rubber-reinforcing glass fiber and the base rubber and the heat resistance of the base rubber required for use in the transmission belt.

The glass-fiber coating liquid of the present invention is characterized in that the acrylonitrile-butadiene rubber (P) is used in combination with the vinylpyridine-styrene-butadiene copolymer (B) of specific monomer content ratio. The combined use of the acrylonitrile-butadiene rubber (P) with the vinylpyridine-styrene-butadiene copolymer (B) of specific monomer content ratio makes it possible to, when the rubber-reinforcing glass fiber is embedded in the heat-resistant base rubber for use as the transmission belt, impart oil resistance to the transmission belt with no loss of the adhesion of the rubber-reinforcing glass fiber to the base rubber and no loss of the water and heat resistance of the transmission belt.

Preferably, the acrylonitrile-butadiene rubber (P) is used in an amount of P/B=29.0 to 80.0% by mass based on 100% of the mass of the vinylpyridine-styrene-butadiene copolymer (B). If the content of the acrylonitrile-butadiene rubber (P) is less than 29.0%, there is no effect of preventing the coating layer of the rubber-reinforcing glass fiber from transferring due to coating stickiness. The content of the acrylonitrile-butadiene rubber (P) is more preferably 25.0% or more. If the content of the acrylonitrile-butadiene rubber (P) exceeds 80%, there arise losses of the adhesion of the rubber-reinforcing glass fiber to the base rubber and, when the rubber-reinforcing glass fiber is embedded in the heat-resistant base rubber for use as the transmission belt, the heat resistance of the transmission belt. The content of the styrene-butadiene copolymer (F) is more preferably 55.0% or less.

It is particularly preferable that the monohydroxybenzene-formaldehyde resin (A), the vinylpyridine-styrene-butadiene copolymer (B), the chlorosulfonated polyethylene (C) and the acrylonitrile-butadiene rubber (P) are preferably contained in amounts of 3 to 8% by mass, 30 to 60% by mass, 8 to 15% by mass and 25 to 60% by mass, respectively, based on the total mass of the monohydroxybenzene-formaldehyde resin (A), the vinylpyridine-styrene-butadiene copolymer (B), the chlorosulfonated polyethylene (C) and the acrylonitrile-butadiene rubber (P) as mentioned above, in order that, when the rubber-reinforcing glass fiber is embedded in the heat-resistant base rubber for use as the transmission belt, the transmission belt can combine high water resistance, high heat resistance and high oil resistance.

The styrene-butadiene copolymer (F) can be used in place of the vinylpyridine-styrene-butadiene copolymer (B) in an amount of F/B=5.0 to 80.0% by mass based on 100% of the mass of the vinylpyridine-styrene-butadiene copolymer (B). If the content of the styrene-butadiene copolymer (F) is less than 5.0%, there is no effect of preventing the coating layer of the rubber-reinforcing glass fiber from transferring due to coating stickiness. The content of the styrene-butadiene copolymer (F) is preferably 25.0% or more. If the content of the styrene-butadiene copolymer (F) exceeds 80.0%, there arise losses of the adhesion of the rubber-reinforcing glass fiber to the base rubber and, when the rubber-reinforcing glass fiber is embedded in the heat-resistant base rubber for use as the transmission belt, the heat resistance of the transmission belt. The content of the styrene-butadiene copolymer (F) is preferably 55.0% or less. An example of the styrene-butadiene copolymer (F) suitable for use in the glass-fiber coating liquid of the present invention is the one commercially available under the trade name of J-9049 from Nippon A&L Inc.

The glass-fiber coating liquid of the present invention further includes at least one additive selected from an antioxidant, a pH adjuster and a stabilizer. Examples of the antioxidant are diphenylamine compounds. An example of the pH adjuster is ammonium.

Next, an explanation will be given to a first embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G) and a bis-allylnagiimide (H) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heat, water and oil resistance, show good dimensional stability and maintain tensile strength after long hours of running under high-temperature high-humidity conditions in the presence of lubricating oil. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-styrene-butadiene copolymer (B), the chlorosulfonated polyethylene (C) and the acrylonitrile-butadiene rubber (P) are dispersed in water, onto the glass fiber cord, applying the secondary glass-fiber coating liquid in which the halogen-containing polymer (G) and 0.3 to 10.0% by mass of the bis-allylnagiimide (H) based on 100% of the mass of the halogen-containing polymer (G), i.e., H/G=0.3 to 10.0% are dispersed in the organic solvent to form the secondary coating layer with a content of the halogen-containing polymer (G) of 10.0 to 70.0% by mass based on the mass of the secondary coating layer, and then, embedding the resulting rubber-reinforcing glass fiber in the cross-linked HNBR material, the transmission belt combines high heat resistance, high water resistance and high oil resistance to secure good dimensional stability and tensile strength and maintain initial adhesion strength between the coated glass fiber and the cross-linked HNBR material even after long hours of running under high-temperature high-humidity conditions in the presence of lubricating oil as compared to the conventional transmission belts.

If the content of the halogen-containing polymer (G) in the secondary coating layer is less than 10.0%, it becomes difficult to obtain the above-mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

At this time, the content of the bis-allylnagiimide (H) in the secondary glass-fiber coating liquid is preferably controlled to 0.3 to 10.0% by mass based on 100% of the mass of the halogen-containing polymer (G), i.e., H/G=0.3 to 10.0% as mentioned above. If the content of the bis-allylnagiimide (H) in the secondary glass-fiber coating liquid is less than 0.3%, it is difficult to attain the above-mentioned high heat resistance. If the content of the bis-allylnagiimide (H) in the secondary glass-fiber coating liquid exceeds 10.0%, the adhesion between the glass fiber and the base rubber becomes so weak that the transmission belt is inferior in durability. The content of the bis-allylnagiimide (H) in the secondary glass-fiber coating liquid is more preferably within the range of 0.3 to 2.0%.

The bis-allylnagiimide (H) is one kind of thermosetting imide resin and, when being of low molecular weight, shows good compatibility with another resin. After the curing, the bis-allylnagiimide resin has a glass transition temperature of 300° C. or higher and thus produces the effect of increasing the heat resistance of the transmission belt.

There can be used, as the bis-allylnagiimide (H), N-N'-hexamethylene diallylnagiimide, N-N'-(m-xylylene) diallylnagiimide and N-N'-(4,4'-diphenylmethane) diallylnagiimide. Among others, N-N'-hexamethylene diallylnagiimide is preferred. Example of the bis-allylnagiimide (H) suitable for used in the rubber-reinforcing glass fiber of the present invention are those commercially available under the trade names of "BANI-M", "BANI-H" and "BANI-X" from Maruzen Petrochemical Co., Ltd.

An explanation will be next given to a second embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G) and a zinc methacrylate (I) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heat, water and oil resistance, shown good dimensional stability and maintain tensile strength after long hours of running of the transmission belt under high-temperature high-humidity conditions in the presence of lubricating oil. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-styrene-butadiene copolymer (B), the chlorosulfonated polyethylene (C) and the acrylonitrile-butadiene rubber (P) are dispersed in water, onto the glass fiber cord, applying the secondary glass-fiber coating liquid in which the halogen-containing polymer (G), the zinc methacrylate (I) and 5.0 to 50.0% by mass of an organic diisocyanate (J) based on 100% of the mass of the halogen-containing polymer (G), i.e., J/G=5.0 to 50.0% are dispersed in the organic solvent to form the secondary coating layer with a content of the halogen-containing polymer (G) of 10.0 to 70.0% by mass based on the mass of the secondary coating layer, and then, embedding the resulting rubber-reinforcing glass fiber in the cross-linked HNBR material, the transmission belt combines high heat resistance, high water resistance and high oil resistance to secure good dimensional stability and tensile strength and maintain initial adhesion strength between the coated glass fiber and the cross-linked HNBR material even after long hours of running under high-temperature high-humidity conditions in the presence of lubricating oil as compared to the conventional transmission belts.

If the content of the halogen-containing polymer (G) in the secondary coating layer is less than 10.0%, it becomes difficult to obtain the above-mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

At this time, the content of the organic diisocyanate (J) in the secondary glass-fiber coating liquid is preferably controlled to 5.0 to 50.0% by mass based on 100% of the mass of the halogen-containing polymer (G), i.e., J/G=5.0 to 50.0% as mentioned above. If the content of the organic diisocyanate (G) in the secondary glass-fiber coating liquid is less than 5.0%, it is difficult to attain the above-mentioned high heat resistance. If the content of the organic diisocyanate (G) in the secondary glass-fiber coating liquid exceeds 50.0%, the adhesion between the glass fiber and the base rubber becomes so weak that the transmission belt is inferior in durability.

There can be used, as the organic diisocyanate (J), hexamethylene diisocyanate, isophorone diisocyanate, methylene-bis(4-cyclohexylisocyanate), toluene diisocyanate, xylene diisocyanate, naphthalene diisocyanate, and methylene-bis(phenylisocyanate). Among others, methylene-bis(phenylisocyanate) and hexamethylene diisocyanate are preferred.

It is further desirable to prepare the secondary glass-fiber coating liquid by dispersing the halogen-containing polymer (G), the organic diisocyanate (J) and 0.001 to 3.0% by mass of the zinc methacrylate (I) based on 100% of the mass of the halogen-containing polymer (G), i.e., I/G=0.001 to 3.0% in the organic solvent and thereby form the secondary coating layer with a content of the halogen-containing polymer (G) of 10.0 to 70.0% by mass based on the mass of the secondary coating layer. When produced by providing the rubber-reinforcing glass fiber with such a secondary coating layer and embedding the rubber-reinforcing glass fiber in the cross-linked HNBR material, the transmission belt combines high heat resistance, high water resistance and high oil resistance to secure good dimensional stability and tensile strength and maintain initial adhesion strength between the coated glass fiber and the cross-linked HNBR material even after long hours of running under high-temperature high-humidity conditions in the presence of lubricating oil.

If the content of the halogen-containing polymer (G) in the secondary coating layer is less than 10.0%, it becomes difficult to obtain the above-mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

The content of the zinc methacrylate (I) in the secondary glass-fiber coating liquid is preferably controlled to 0.001 to 3.0% by mass based on 100% of the mass of the halogen-containing polymer (G), i.e., I/G=0.001 to 3.0% as mentioned above. If the content of the zinc methacrylate (I) in the secondary glass-fiber coating liquid is less than 0.001%, it is difficult to attain the above-mentioned high heat resistance. If the content of the zinc methacrylate (I) in the secondary glass-fiber coating liquid exceeds 3.0%, the adhesion between the glass fiber and the base rubber becomes so weak that the transmission belt is inferior in durability.

An explanation will be next given to a third embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G) and a maleimide (K) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heat, water and oil resistance, show good dimensional stability and maintain tensile strength after long hours of running of the transmission belt under high-temperature high-humidity conditions in the presence of lubricating oil. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-styrene-butadiene copolymer (B), the chlorosulfonated polyethylene (C) and the acrylonitrile-butadiene rubber (P) are dispersed in water, onto the glass fiber cord, applying the secondary glass-fiber coating layer in which the halogen-containing polymer (G) and 20.0 to 90.0% by mass of the maleimide (K) based on 100% of the total mass of the halogen-containing polymer (G) and the maleimide (K), i.e., K/(G+K)=20.0 to 90.0% are disposed in the organic solvent to form the secondary coating layer with a content of the halogen-containing polymer (G) of 10.0 to 70.0% by mass based on the mass of the secondary coating layer, and then, embedding the resulting rubber-reinforcing glass fiber in the cross-linked HNBR material, the transmission belt combines high heat resistance, high water resistance and high oil resistance to secure good dimensional stability and tensile strength and maintain initial adhesion strength between the coated glass fiber and the cross-linked HNBR material even after long hours of running under high-temperature high-humidity conditions in the presence of lubricating oil as compared to the conventional transmission belts.

If the content of the halogen-containing polymer (G) in the secondary coating layer is less than 10.0%, it becomes difficult to obtain the above-mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

The content of the maleimide (K) in the secondary glass-fiber coating liquid is preferably controlled to 20.0 to 90.0% by mass assuming the total mass of the halogen-containing polymer (G) and the maleimide (K) as 100%, i.e., K/(G+K)= 20.0 to 90.0%. If the content of the maleimide (K) in the secondary glass-fiber coating liquid is less than 20.0%, it is difficult to attain the above-mentioned high heat resistance. If the content of the maleimide (K) in the secondary glass-fiber coating liquid exceeds 90.0%, the adhesion between the glass fiber and the base rubber becomes so weak that the transmission belt is inferior in durability.

There can be used, as the maleimide (K), N,N-m-phenylene di-maleimide, 4,4'-diphenylmethane bis-maleimide, polyphenylmethane maleimide, m-phenylene bis-maleimide, 4-methyl-1,3-phenylene bis-maleimide, 4,4'-diphenylether bis-maleimide, 4,4'-diphenylsulfone bis-maleimide, chlorophenyl maleimide, methylphenyl maleimide, hydroxyphenyl maleimide, carboxyphenyl maleimide, dodecyl maleimide and cyclohexyl maleimide. Among others, N,N-m-phenylene di-maleimide is preferred.

An explanation will be next given to a fourth embodiment of the present invention in which the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer.

It is preferable to form the secondary coating layer of the secondary glass-fiber coating liquid in which a halogen-containing polymer (G), a vulcanization agent (L), a triazine compound (M) and an inorganic filler (N) are dispersed in an organic solvent, after applying and drying the primary coating layer of the above glass-fiber coating liquid onto the glass fiber cord, for production of the rubber-reinforcing glass fiber. When the rubber-reinforcing glass fiber is formed with such a secondary coating layer and embedded in the base rubber, notably heat-resistant cross-linked HNBR material, of the transmission belt, it becomes possible to provide good adhesion between the glass fiber and the base rubber so that the rubber-reinforcing glass fiber functions effectively as the reinforcement in the transmission belt. It becomes further possible for the coating layer to provide high heater, water and oil resistance, show good dimensional stability and maintain tensile strength after long hours of running of the transmission belt under high-temperature high-humidity conditions in the presence of lubricating oil. As the organic solvent of the secondary glass-fiber coating liquid, there can be used xylene.

Especially when produced by applying and drying the glass-fiber coating liquid of the present invention, in which the monohydroxybenzene-formaldehyde resin (A) obtained by reaction of monohydroxybenzene (D) and formaldehyde (E), the vinylpyridine-styrene-butadiene copolymer (B), the chlorosulfonated polyethylene (C) and the acrylonitrile-butadiene rubber (P) are dispersed in water, onto the glass fiber cord, applying the secondary glass-fiber coating liquid in which the triazine compound (M) is dispersed in the organic solvent in an amount of M/G=0.3 to 10.0% based on 100% of the mass of the halogen-containing polymer (G) to form the secondary coating layer with a content of the halogen-containing polymer (G) of 10.0 to 70.0% by mass based on the mass of the secondary coating layer, and then, embedding the resulting rubber-reinforcing glass fiber in the cross-linked HNBR material, the transmission belt combines high heat resistance, high water resistance and high oil resistance to secure good dimensional stability and tensile strength and maintain initial adhesion strength between the coated glass fiber and the cross-linked HNBR material even after long hours of running under high-temperature high-humidity conditions in the presence of lubricating oil as compared to the conventional transmission belt.

If the content of the halogen-containing polymer (G) in the secondary coating layer is less than 10.0%, it becomes difficult to obtain the above-mentioned high heat resistance. If the content of the halogen-containing polymer (G) in the secondary coating layer exceeds 70.0%, the adhesion between the glass fiber and the base rubber becomes so weak that the transmission belt is inferior in durability. The content of the halogen-containing polymer (G) in the secondary coating layer is preferably within the range of 25.0 to 60.0%.

At this time, the content of the triazine compound (M) in the secondary glass-fiber coating liquid is preferably controlled to 0.3 to 10.0% by mass based on 100% of the mass of the halogen-containing polymer (G), i.e., M/G=0.3 to 10.0%. If the content of the triazine compound (M) in the secondary glass-fiber coating liquid is less than 0.3%, it is difficult to attain the above-mentioned high heat resistance. If the content of the triazine compound (L) in the secondary glass-fiber coating liquid exceeds 10.0%, the adhesion between the glass fiber and the base rubber becomes so weak that the transmission belt is inferior in durability.

There can be used, as the triazine compound (M), triallyl cyanurate and triallyl isocyanurate.

In each of the first to fourth embodiments of the present invention where the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer, it is desirable to add a vulcanization agent (L) in the secondary glass-fiber coating liquid. The content of the vulcanization agent (L) in the secondary glass-fiber coating liquid is preferably within the range of 0.5 to 50.0% by mass based on 100% of the mass of the halogen-containing polymer (G), i.e., L/G=0.5 to 50.0%. If the content of the vulcanization agent (L) in the secondary glass-fiber coating liquid is less than 0.5%, it becomes difficult to obtain the above-mentioned high heat resistance. If the content of the vulcanization agent (L) in the secondary glass-fiber coating liquid exceeds 50.0%, the adhesion between the glass fiber and the base rubber becomes so weak that the transmission belt is inferior in durability.

Examples of the vulcanization agent (L) are nitroso compounds and/or zinc compounds.

It is also desirable to add an inorganic filler (N) in the secondary glass-fiber coating liquid in each of the first to fourth embodiments of the present invention where the rubber-reinforcing glass fiber is produced by applying and drying the above glass-fiber coating liquid to form the primary coating layer on the glass fiber cord, and then, applying the secondary glass-fiber coating liquid to form the secondary coating layer on the primary coating layer. The content of the inorganic filler (N) in the secondary glass-fiber coating liquid is preferably within the range of 10.0 to 70.0% by mass based on 100% of the mass of the halogen-containing polymer (G), i.e., N/G=10.0 to 70.0%. If the content of the inorganic filler (N) in the secondary glass-fiber coating liquid is less than 10.0%, it becomes difficult to obtain the above-mentioned high heat resistance. If the content of the inorganic filler (N) in the secondary glass-fiber coating liquid exceeds 70.0%, the adhesion between the glass fiber and the base rubber becomes so weak that the transmission belt is inferior in durability.

Examples of the inorganic filler (N) are carbon black and magnesium oxide.

The addition of the nitroso compound such as p-nitrosobenzene as the vulcanization agent (L) and the inorganic filler (N) such as carbon black or magnesium oxide into the secondary glass-fiber coating liquid is more effective in, when the rubber-reinforcing glass fiber is formed with the secondary coating layer and embedded in the base rubber for use as the transmission belt, increasing the heat resistant of the transmission belt.

The transmission belt attains higher heat resistance when produced by applying the secondary glass-fiber coating liquid containing 0.5 to 20.0% by mass of the vulcanization agent (L) and 10.0 to 70.0% by mass of the inorganic filler (N) based on 100% of the mass of the halogen-containing polymer (G) to form the secondary coating layer on the rubber-reinforcing glass fiber, and then, embedding the resulting rubber-reinforcing glass fiber in the heat-resistant rubber material. If the content of the vulcanization agent (L) is less than 0.5% and if the content of the inorganic filler (N) is less than 10.0%, it may be difficult to obtain a sufficient heat resistance improvement effect. There is no need to add more than 20% of the vulcanization agent (L) and more than 70% of the inorganic filler (N).

In view of the heat resistance, it is desirable to use a chlorosulfonated polyethylene (C) as the halogen-containing polymer (G).

EXAMPLES

In Reference Examples 1 to 10, test samples of rubber-reinforcing glass fibers were each produced by preparing a glass-fiber coating liquid in the form of an emulsion of a monohydroxybenzene-formaldehyde resin (A), a vinylpyridine-styrene-butadiene copolymer (B), a chlorosulfonated polyethylenes (C) and water, applying and drying the glass-fiber coating liquid onto a glass fiber cord, preparing a secondary glass-fiber coating liquid in the form of a dispersion system of an organic solvent and either a halogen-containing polymer (G) and a bis-allylnagiimide (H), a halogen-containing polymer (G), an organic diisocyanate (J) and zinc methacrylate (I), a halogen-containing polymer (G) and a maleimide (K) or a halogen-containing polymer (G) and a triazine compound (M) and applying the secondary glass-fiber coating liquid onto the above-coated glass fiber cord.

In Examples 1 to 5, test samples of rubber-reinforcing glass fibers were each produced by preparing a glass-fiber coating liquid in the form of an emulsion of monohydroxybenzene-formaldehyde resin (A), a vinylpyridine-styrene-butadiene copolymer (B) (vinylpyridine monomer content: 17 to 35 mass %, styrene monomer content: 20 to 40 mass %, butadiene monomer content: 35 to 60 mass %), a chlorosulfonated polyethylenes (C), an acrylonitrile-butadiene rubber (P) and water, applying and drying the glass-fiber coating liquid onto a glass fiber cord, preparing a secondary glass-fiber coating liquid in the form of a dispersion system of an organic solvent, a halogen-containing polymer (G) and a bis-allylnagiimide (H), and then, applying the secondary glass-fiber coating liquid onto the above-coated glass fiber cord.

In Comparative Examples 1 to 3, test samples of conventional rubber-reinforcing glass fibers were produced.

For performance comparisons, the rubber-reinforcing glass fibers of Reference Examples 1 to 10, Examples 1 to 5 and Comparative Examples 1 to 3 were tested for their strength of adhesion to heat-resistant rubber materials.

Transmission belts were produced by embedding the rubber-reinforcing glass fibers of Reference Examples 1 to 10, Examples 1 to 5 and Comparative Examples 1 to 3 in heat-resistant rubber materials. Each of the transmission belts was subjected to water-resistance running fatigue test. The water-resistance running fatigue test was performed by running the transmission belt around pulleys for long hours under wet conditions so as to test whether the transmission belt could secure good dimensional stability without change in tensile strength after long hours of running, owing to the ability of the coating layer to maintain initial strength of adhesion to the base rubber material, and thereby evaluate belt water resistance with comparisons of the test results. Each of the transmission belts was also subjected to heat-resistance and flexion-resistance running fatigue test. The heat-resistance and flexion-resistance running fatigue test was performed by bending and running the transmission belt around a plurality of pulleys for long hours under high-temperature conditions, so as to test whether the transmission belt could secure good dimensional stability without change in tensile strength after long hours of running, owing to the ability of the coating layer to maintain initial strength of adhesion to the base rubber material, and to thereby evaluate belt heat resistance with comparisons of the test results.

Further, films were formed by applying and drying the glass-fiber coating liquids of Reference Examples 1 to 10, Examples 1 to 5 and Comparative Examples 1 to 3. Each of the films was immersed in oil and tested for the amount of the oil absorbed onto the film.

Furthermore, test samples were also produced by embedding the rubber-reinforcing glass fibers of Reference Examples 1 to 10, Examples 1 to 5 and Comparative Examples 1 to 3 in heat-resistant rubber materials and tested for the water resistance, heat resistance and oil resistance by MIT bending test.

A detailed explanation of Reference Examples 1-10, Examples 1-5 and Comparative Examples 1-3 will be given below.

(Sample Production)

Reference Example 1

(Preparation of Glass-Fiber Coating Liquid)

The synthesis of the monohydroxybenzene-formaldehyde resin (A) will be first explained below. A three-neck separable flask having a reflux condenser, a temperature gauge and a stirrer was charged with 100 parts by mass of monohydroxybenzene (D), 157 parts by mass of 37 mass % aqueous formaldehyde (E) (mole ratio: E/D=1.8) and 5 parts by mass of 10 mass % aqueous sodium hydroxide, followed by stirring these ingredients for 3 hours under heating at 80° C. After the stirring was stopped, the resultant mixture was cooled, blended with 370 parts by mass of 1 mass % aqueous sodium hydroxide and subjected to polymerization to yield the monohydroxybenzene-formaldehyde resin (A).

Aqueous ammonia and water were added into the yielded monohydroxybenzene-formaldehyde resin (A) together with commercially available emulsions of the vinylpyridine-styrene-butadiene copolymer (B) and the chlorosulfonated polyethylene (C), thereby obtaining the glass-fiber coating liquid.

More specifically, the glass-fiber coating liquid was prepared by mixing 42 parts by mass of the monohydroxybenzene-formaldehyde resin (A), 476 parts by mass of the emulsion of the vinylpyridine-styrene-butadiene copolymer (B) available under the trade name of Pyratex (vinylpyridine-styrene-butadiene mass ratio: 15:15:70, solid content: 41.0 mass %) from Nippon A&L Inc., 206 parts by mass of the emulsion of the chlorosulfonated polyethylene (C) available under the trade name of CSM450 (solid content: 40.0 mass %) from Sumitomo Seika Chemicals Co., Ltd. and 22 parts by mass of aqueous ammonia (concentration: 25.0 mass %) as the PH adjuster with water based on 1000 parts by mass of the total of these components.

The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=3.6%, B/(A+B+C)=67.8% and C/(A+B+C)=28.6%, respectively, assuming the total mass of the monohydroxybenzene-formaldehyde resin (A), the vinylpyridine-styrene-butadiene copolymer (B) and the chlorosulfonated polyethylene (C) as 100%. The mass of the vinylpyridine-styrene-butadiene copolymer (B) and the mass of the chlorosulfonated polyethylene (C) were determined by conversion of the solid contents of Pyratex and CSM450 into the mass units.

(Production of Rubber-Reinforcing Glass Fiber)

The secondary glass-fiber coating liquid was next prepared by mixing and dispersing a chlorosulfonated polyethylene (C), p-dinitrosobenzene, hexamethylene diallylnagiimide as the bis-allylnagiimide (H) and carbon black into xylene to form the secondary coating layer on the rubber-reinforcing glass fiber.

More specifically, 100 parts by mass of the chlorosulfonated polyethylene (G) available under the trade name of TS-430 from Tosoh Corporation, 40 parts by mass of p-dinitrosobenzene, 0.3 parts by mass of N-N'-hexamethylene diallylnagiimide available under the trade name of BANI-H from Maruzen Petrochemical Co., Ltd. and 30 parts by mass of carbon black were mixed together, followed by dispersing the resultant mixture into 1315 parts by mass of xylene to obtain the secondary glass-fiber coating liquid. The contents of N-N'-hexamethylene diallylnagiimide as the bis-allylnagiimide (G), p-dinitrosobenzene as the vulcanization agent and carbon black as the inorganic filler in the secondary glass-fiber coating liquid were H/G=0.3 mass %, 40 mass % and 30 mass %, respectively, based on the mass of the chlorosulfonated polyethylene (G).

Three glass fiber cords, each of which had 200 glass fiber filaments of 9 μm in diameter, were aligned with one another. The above-prepared glass-fiber coating liquid was applied to the glass fiber cords and dried for 22 seconds at a temperature of 280° C. to form the primary coating layer on the glass fiber cords.

The solid matter adhesion rate, i.e., the mass percentage of the coating layer was 19.0 mass % based on the total mass of the primary coated glass fiber cords.

The coated glass fiber cords were then subjected to two times of initial twist per 2.54 cm in one direction to provide a strand of the coated glass fiber cords. Thirteen strands of the coated glass fiber cords were provided in total and subjected to two times of final twist per 2.54 cm in the opposite direction. The above-prepared secondary glass-fiber coating liquid was applied to the stranded glass fiber cords and dried for 1 minute at a temperature of 110° C. to form the secondary coating layer on the glass fiber cords. In this way, two types of the rubber-reinforcing glass fibers having opposite initial and final twist directions (referred to S-twist and Z-twist fibers) were produced.

The solid matter adhesion rate, i.e., the mass percentage of the secondary coating layer was 3.5 mass % based on the total mass of the primary and secondary coated glass fiber cords.

Reference Example 2

The glass-fiber coating liquid was prepared in the same manner as in Reference Example 1, except that the glass-fiber coating liquid contained 83 parts by mass of the monohydroxybenzene-formaldehyde resin (A) and 451 parts by mass of the emulsion of the vinylpyridine-styrene-butadiene copolymer (B) available under the trade name of Pyratex (vinylpyridine-styrene-butadiene mass ratio: 15:15:70, solid content: 41.0 mass %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=7.2%, B/(A+B+C)=64.2% and C/(A+B+C)=28.6%, respectively, assuming the total mass of the monohydroxybenzene-formaldehyde resin (A), the vinylpyridine-styrene-butadiene copolymer (B) and the chlorosulfonated polyethylene (C) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Reference Example 3

The glass-fiber coating liquid was prepared in the same manner as in Reference Example 1, except that the glass-fiber coating liquid contained 124 parts by mass of the monohydroxybenzene-formaldehyde resin (A) and 426 parts by mass of the emulsion of the vinylpyridine-styrene-butadiene copolymer (B) available under the trade name of Pyratex (vinylpyridine-styrene-butadiene mass ratio: 15:15:70, solid content: 41.0 mass %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=10.8%, B/(A+B+C)=60.6% and C/(A+B+C)=28.6%, respectively, assuming the total mass of the monohydroxybenzene-formaldehyde resin (A), the vinylpyridine-styrene-butadiene copolymer (B) and the chlorosulfonated polyethylene (C) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Reference Example 4

As the monohydroxybenzene-formaldehyde resin (A), a monohydroxybenzene-formaldehyde resin available under the trade name of Resitop PL-4667 (solid content: 50 mass %) from Gun Ei Chemical Industry Co., Ltd. was diluted to twice its mass with 1 mass % aqueous sodium hydroxide.

The glass-fiber coating liquid was prepared in the same manner as in Reference Example 1, except that the glass-fiber coating liquid contained 83 parts by mass of the above diluent of Resitop as the monohydroxybenzene-formaldehyde resin (A) and 451 parts by mass of the emulsion of the vinylpyridine-styrene-butadiene copolymer (B) available under the trade name of Pyratex (vinylpyridine-styrene-butadiene mass ratio: 15:15:70, solid content: 41.0 mass %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=7.2%, B/(A+B+C)=64.2% and C/(A+B+C)=28.6%, respectively, assuming the total mass of the monohydroxybenzene-formaldehyde resin (A), the vinylpyridine-styrene-butadiene copolymer (B) and the chlorosulfonated polyethylene (C) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Reference Example 5

The same glass-fiber coating liquid as that of Reference Example 2 was prepared. The prepared glass-fiber coating liquid was applied to form the coating layer on the glass fiber cords in the same manner as in Reference Example 1.

The secondary glass-fiber coating liquid was prepared by mixing 100 parts by mass of chlorosulfonated polyethylene available as the halogen-containing polymer (G) under the trade name of TS-430 from Tosoh Corporation, 40 parts by mass of p-dinitrosobenzene, 25 parts by mass of hexamethylene diisocyanate as the organic diisocyanate (J), 3.0 parts by mass of the zinc methacrylate (I) and 30 parts by mass of carbon black, and then, dispersing the resultant mixture into 1315 parts by mass of xylene. The contents of hexamethylene diisocyanate, zinc methacrylate (I) and carbon black as the inorganic filler in the secondary glass-fiber coating liquid were J/G=25.0 mass %, I/G=3.0 mass % and 30 mass %, respectively, based on the mass of the chlorosulfonated polyethylene.

Then, the rubber-reinforcing glass fibers were produced by applying the secondary coating layer onto the above coated glass fiber cords in the same manner as in Reference Example 1.

Reference Example 6

The same glass-fiber coating liquid as that of Reference Example 2 was prepared. The prepared glass-fiber coating liquid was applied to form the coating layer on the glass fiber cords in the same manner as in Reference Example 1.

The secondary glass-fiber coating liquid was prepared by mixing 100 parts by mass of chlorosulfonated polyethylene available as the halogen-containing polymer (G) under the trade name of TS-430 from Tosoh Corporation, 40 parts by mass of p-dinitrosobenzene and N,N-m-phenylene di-maleimide as the maleimide (K) in an amount of K/G=50 mass % and 30 parts by mass of carbon black, and then, dispersing the resultant mixture into 1315 parts by mass of xylene. The contents of N,N-m-phenylene di-maleimide as the maleimide, zinc methacrylate as the vulcanization agent and carbon black as the inorganic filler in the secondary glass-fiber coating liquid were 50.0 mass %, K/G=3.0 mass % and 30.0 mass %, respectively, based on the mass of the chlorosulfonated polyethylene.

Then, the rubber-reinforcing glass fibers were produced by applying the secondary coating layer onto the above coated glass fiber cords in the same manner as in Reference Example 1.

Reference Example 7

The same glass-fiber coating liquid as that of Reference Example 2 was prepared. The prepared glass-fiber coating liquid was applied to form the coating layer on the glass fiber cords in the same manner as in Reference Example 1.

The secondary glass-fiber coating liquid was prepared by mixing 100 parts by mass of chlorosulfonated polyethylene available as the halogen-containing polymer (G) under the trade name of TS-430 from Tosoh Corporation, 40 parts by mass of p-dinitrosobenzene as the vulcanization agent (L), triallyl cyanurate as the triazine compound (M) in an amount of M/G=2.0 mass % and 30 parts by mass of carbon black as the inorganic filler (N), and then, dispersing the resultant mixture into 1315 parts by mass of xylene. The contents of p-dinitrosobenzene as the vulcanization agent (L), triallyl cyanurate as the triazine compound (M) and carbon black as the inorganic filler (N) in the secondary glass-fiber coating liquid were L/G=40.0 mass %, M/G=2.0 mass % and N/G=30.0 mass %, respectively, based on the mass of the chlorosulfonated polyethylene.

Then, the rubber-reinforcing glass fibers were produced by applying the secondary coating layer onto the above coated glass fiber cords in the same manner as in Reference Example 1.

Reference Example 8

The same glass-fiber coating liquid as that of Reference Example 2 was prepared. The prepared glass-fiber coating liquid was applied to form the coating layer on the glass fiber cords in the same manner as in Reference Example 1.

The secondary glass-fiber coating liquid was prepared by mixing 100 parts by mass of chlorosulfonated polyethylene available as the halogen-containing polymer (G) under the trade name of TS-430 from Tosoh Corporation, 40 parts by mass of p-dinitrosobenzene as the vulcanization agent (L), triallyl isocyanurate as the triazine compound (M) in an amount of M/G=2.0 mass % and 30 parts by mass of carbon black as the inorganic filler (N), and then, dispersing the resultant mixture into 1315 parts by mass of xylene. The contents of p-dinitrosobenzene as the vulcanization agent (L), triallyl isocyanurate as the triazine compound (M) and carbon black as the inorganic filler (N) in the secondary glass-fiber coating liquid were L/G=40.0 mass %, M/G=2.0 mass % and N/G=30.0 mass %, respectively, based on the mass of the chlorosulfonated polyethylene.

The rubber-reinforcing glass fibers were then produced by applying the secondary coating layer onto the above coated glass fiber cords in the same manner as in Reference Example 1.

Reference Example 9

The same glass-fiber coating liquid as that of Reference Example 1 was prepared.

Further, the secondary glass-fiber coating liquid was prepared by dispersing 100 parts by mass of chlorosulfonated polyethylene available as the halogen-containing polymer (G) under the trade name of TS-430 from Tosoh Corporation, 40 parts by mass of 4,4'-diphenylmethane diisocyanate as the organic diisocyanate (J) and 30 parts by mass of carbon black into 1315 parts by mass of xylene. The contents of 4,4'-diphenylmethane diisocyanate as the organic diisocyanate (J) and carbon black as the inorganic filler in the secondary glass-fiber coating liquid were 40.0 mass % and 30.0 mass %, respectively, based on the mass of the chlorosulfonated polyethylene.

The rubber-reinforcing glass fibers were then produced by applying the primary and secondary coating layers onto the glass fiber cords in the same manner as in Reference Example 1.

Reference Example 10

The glass-fiber coating liquid was prepared in the same manner as in Reference Example 1, except that the glass-fiber coating liquid contained 124 parts by mass of the monohydroxybenzene-formaldehyde resin (A) and 426 parts by mass of the emulsion of the vinylpyridine-styrene-butadiene copolymer (B) available under the trade name of Pyratex (vinylpyridine-styrene-butadiene mass ratio: 15:15:70, solid content: 41.0 mass %) from Nippon A&L Inc. The contents of the monohydroxybenzene-formaldehyde resin (A), the vinylpyridine-styrene-butadiene copolymer (B) and the chlorosulfonated polyethylene (C) in the glass-fiber coating liquid were A/(A+B+C)=10.8%, B/(A+B+C)=60.6% and C/(A+B+C)=28.6%, respectively, assuming the total mass of the monohydroxybenzene-formaldehyde resin (A), the vinylpyridine-styrene-butadiene copolymer (B) and the chlorosulfonated polyethylene (C) as 100%.

Further, the same secondary glass-fiber coating liquid as that of Reference Example 9 was prepared.

The rubber-reinforcing glass fibers were then produced by applying the primary and secondary coating layers onto the glass fiber cords in the same manner as in Reference Example 1.

Example 1

As the monohydroxybenzene-formaldehyde resin (A), a monohydroxybenzene-formaldehyde resin available under the trade name of Resitop PL-4667 (solid content: 50 mass %) from Gun Ei Chemical Industry Co., Ltd. was diluted to twice its mass with 1mass % aqueous sodium hydroxide. As the vinylpyridine-styrene-butadiene copolymer (B), a vinylpyridine-styrene-butadiene copolymer emulsion available under the trade name of Pyratex LB (vinylpyridine-styrene-butadiene mass ratio: 20:35:45, solid content: 41.0 mass %) from Nippon A&L Inc. was provided. As the chlorosulfonated polyethylene (C), a chlorosulfonate polyethylene emulsion available under the trade name of CSM450 (solid content: 40.0 mass %) from Sumitomo Seika Chemicals Co., Ltd. was provided. Further, a acrylonitrile-butadiene copolymer emulsion available under the trade name of Nipol 1562 (solid content: 41 mass %) from Nippon Zeon Corporation was provided as the acrylonitrile-butadiene copolymer (P). The glass-fiber coating liquid was prepared by mixing 31 parts by mass of the monohydroxybenzene-formaldehyde resin (A), 236 parts by mass of the vinylpyridine-styrene-butadiene copolymer (B), 70 parts by mass of the chlorosulfonated polyethylene (C), 342 parts by mass of the acrylonitrile-butadiene copolymer (P) and 20 parts by mass of aqueous ammonia (concentration: 25.0 mass %) as the PH adjuster with water based on 1000 parts by mass of the total of these components.

The contents of the monohydroxybenzene-formaldehyde resin (A), the vinylpyridine-styrene-butadiene copolymer (B), the chlorosulfonated polyethylene (C) and the acrylonitrile-butadiene copolymer (P) in the glass-fiber coating liquid were $A/(A+B+C+P)=5.5\%$, $B/(A+B+C+P)=34.5\%$, $C/(A+B+C+P)=10.0\%$ and $P/(A+B+C+P)=50.0\%$, respectively, assuming the total mass of the monohydroxybenzene-formaldehyde resin (A), the vinylpyridine-styrene-butadiene copolymer (B), the chlorosulfonated polyethylene (C) and the acrylonitrile-butadiene copolymer (P) as 100%.

Further, the same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Example 2

The glass-fiber coating liquid was prepared in the same manner as in Example 1, except that the glass-fiber coating liquid contained 39 parts by mass of the monohydroxybenzene-formaldehyde resin (A) (Resitop PL-4667), 239 parts by mass of the vinylpyridine-styrene-butadiene copolymer (B) (Pyratex LB, vinylpyridine-styrene-butadiene mass ratio: 20:35:45), 62 parts by mass of the chlorosulfonated polyethylene (C) (CSM450), 236 parts by mass of the acrylonitrile-butadiene copolymer (P) (Nipol 1562) and 20 parts by mass of aqueous ammonia (concentration: 25.0 mass %) as the PH adjuster. The contents of the monohydroxybenzene-formaldehyde resin (A), the vinylpyridine-styrene-butadiene copolymer (B), the chlorosulfonated polyethylene (C) and the acrylonitrile-butadiene copolymer (P) in the glass-fiber coating liquid were $A/(A+B+C+P)=6.9\%$, $B/(A+B+C+P)=49.6\%$, $C/(A+B+C+P)=8.9\%$ and $P/(A+B+C+P)=34.6\%$, respectively, assuming the total mass of the monohydroxybenzene-formaldehyde resin (A), the vinylpyridine-styrene-butadiene copolymer (B), the chlorosulfonated polyethylene (C) and the acrylonitrile-butadiene copolymer (P) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Example 3

The glass-fiber coating liquid was prepared in the same manner as in Example 1, except that the glass-fiber coating liquid contained 22 parts by mass of the monohydroxybenzene-formaldehyde resin (A) (Resitop PL-4667), 368 parts by mass of the vinylpyridine-styrene-butadiene copolymer (B) (Pyratex LB, vinylpyridine-styrene-butadiene mass ratio: 20:35:45), 90 parts by mass of the chlorosulfonated polyethylene (C) (CSM450), 201 parts by mass of the acrylonitrile-butadiene copolymer (P) (Nipol 1562) and 20 parts by mass of aqueous ammonia (concentration: 25.0 mass %) as the PH adjuster. The contents of the monohydroxybenzene-formaldehyde resin (A), the vinylpyridine-styrene-butadiene copolymer (B), the chlorosulfonated polyethylene (C) and the acrylonitrile-butadiene copolymer (P) in the glass-fiber coating liquid were $A/(A+B+C+P)=3.9\%$, $B/(A+B+C+P)=53.9\%$, $C/(A+B+C+P)=12.8\%$ and $P/(A+B+C+P)=29.4\%$, respectively, assuming the total mass of the monohydroxybenzene-formaldehyde resin (A), the vinylpyridine-styrene-butadiene copolymer (B), the chlorosulfonated polyethylene (C) and the acrylonitrile-butadiene copolymer (P) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Example 4

The glass-fiber coating liquid was prepared in the same manner as in Example 1, except that the glass-fiber coating liquid contained 17 parts by mass of the monohydroxybenzene-formaldehyde resin (A) (Resitop PL-4667), 211 parts by mass of the vinylpyridine-styrene-butadiene copolymer (B) (Pyratex LB, vinylpyridine-styrene-butadiene mass ratio: 20:35:45), 58 parts by mass of the chlorosulfonated polyethylene (C) (CSM450), 394 parts by mass of the acrylonitrile-butadiene copolymer (P) (Nipol 1562) and 20 parts by mass of aqueous ammonia (concentration: 25.0 mass %) as the PH adjuster. The contents of the monohydroxybenzene-formaldehyde resin (A), the vinylpyridine-styrene-butadiene copolymer (B), the chlorosulfonated polyethylene (C) and the acrylonitrile-butadiene copolymer (P) in the glass-fiber coating liquid were $A/(A+B+C+P)=3.1\%$, $B/(A+B+C+P)=30.9\%$, $C/(A+B+C+P)=8.3\%$ and $P/(A+B+C+P)=57.7\%$, respectively, assuming the total mass of the monohydroxybenzene-formaldehyde resin (A), the vinylpyridine-styrene-butadiene copolymer (B), the chlorosulfonated polyethylene (C) and the acrylonitrile-butadiene copolymer (P) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Example 5

The glass-fiber coating liquid was prepared in the same manner as in Example 1, except that the glass-fiber coating liquid contained 31 parts by mass of the monohydroxybenzene-formaldehyde resin (A) (Resitop PL-4667), 478 parts by mass of the vinylpyridine-styrene-butadiene copolymer (B) (Pyratex LB, vinylpyridine-styrene-butadiene mass ratio: 20:35:45), 70 parts by mass of the chlorosulfonated polyethylene (C) (CSM450), 99 parts by mass of the acrylonitrile-butadiene copolymer (P) (Nipol 1562) and 20 parts by mass of aqueous ammonia (concentration: 25.0 mass %) as the PH adjuster. The contents of the monohydroxybenzene-formaldehyde resin (A), the vinylpyridine-styrene-butadiene copolymer (B), the chlorosulfonated polyethylene (C) and the acrylonitrile-butadiene copolymer (P) in the glass-fiber coating liquid were A/(A+B+C+P)=5.5%, B/(A+B+C+P)=70.0%, C/(A+B+C+P)=10.0% and P/(A+B+C+P)=14.5%, respectively, assuming the total mass of the monohydroxybenzene-formaldehyde resin (A), the vinylpyridine-styrene-butadiene copolymer (B), the chlorosulfonated polyethylene (C) and the acrylonitrile-butadiene copolymer (P) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Comparative Example 1

The conventional glass-fiber coating liquid of resorcinol-formaldehyde resin, vinylpyridine-styrene-butadiene copolymer emulsion and chlorosulfonated polyethylene was prepared.

More specifically, the glass-fiber coating liquid was prepared in the same manner as in Reference Example 1, except that the glass-fiber coating liquid contained 239 parts by mass of a resorcinol-formaldehyde resin (resorcinol-formaldehyde mole ratio: 1.0:1.0, solid content: 8.7 mass %) in place of the monohydroxybenzene-formaldehyde resin (A) and 451 parts by mass of the vinylpyridine-styrene-butadiene emulsion available under the trade name of Pyratex (vinylpyridine-styrene-butadiene mass ratio: 15:15:70, solid content: 41.0 mass %) from Nippon A&L Inc. The contents of the resorcinol-formaldehyde resin (A), the vinylpyridine-styrene-butadiene copolymer (B) and the chlorosulfonated polyethylene (C) in the glass-fiber coating liquid were A/(A+B+C)=7.2%, B/(A+B+C)=64.2% and C/(A+B+C)=28.6%, respectively, assuming the total mass of the resorcinol-formaldehyde resin (A), the vinylpyridine-styrene-butadiene copolymer (B) and the chlorosulfonated polyethylene (C) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Comparative Example 2

The glass-fiber coating liquid was prepared in the same manner as in Example 1, except that: the vinylpyridine-styrene-butadiene copolymer (B) was not contained in the glass-fiber coating liquid. More specifically, the glass-fiber coating liquid was prepared by mixing 51 parts by mass of the monohydroxybenzene-formaldehyde resin (A) provided in the same manner as in Example 1, 160 parts by mass of the chlorosulfonated polyethylene (C) available under the trade name of CSM450 (solid content: 40.0 mass %) from Sumitomo Seika Chemicals Co., Ltd., 465 parts by mass of the acrylonitrile-butadiene copolymer (P) available under the trade name of Nipol 1562 (solid content: 41 mass %) from Nippon Zeon Corporation and 20 parts by mass of aqueous ammonia (concentration: 25.0 mass %) as the PH adjuster with water based on 1000 parts by mass of the total of these components. The contents of the monohydroxybenzene-formaldehyde resin (A), the chlorosulfonated polyethylene (C) and the acrylonitrile-butadiene copolymer (P) in the glass-fiber coating liquid were A/(A+C+P)=9.1%, C/(A+C+P)=22.8% and P/(A+C+P)=68.1%, respectively, assuming the total mass of the monohydroxybenzene-formaldehyde resin (A), the chlorosulfonated polyethylene (C) and the acrylonitrile-butadiene copolymer (P) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

Comparative Example 3

The glass-fiber coating liquid was prepared in the same manner as in Example 1, except that: the same monohydroxybenzene-formaldehyde resin (A) as that of Reference Example 1 was used; and the vinylpyridine-styrene-butadiene copolymer emulsion available under the trade name of Pyratex (vinylpyridine-styrene-butadiene mass ratio: 15:15:70, solid content: 41.0 mass %) from Nippon A&L Inc. was used as the vinylpyridine-styrene-butadiene copolymer (B). More specifically, the glass-fiber coating liquid was prepared by mixing 31 parts by mass of the monohydroxybenzene-formaldehyde resin (A) provided in the same manner as in Example 1, 236 parts by mass of the vinylpyridine-styrene-butadiene copolymer (B) available under the trade name of Pyratex (vinylpyridine-styrene-butadiene mass ratio: 15:15:70, solid content: 41.0 mass %) from Nippon A&L Inc., 70 parts by mass of the chlorosulfonated polyethylene (C) available under the trade name of CSM450 (solid content: 40.0 mass %) from Sumitomo Seika Chemicals Co., Ltd., 342 parts by mass of the acrylonitrile-butadiene copolymer (P) available under the trade name of Nipol 1562 (solid content: 41 mass %) from Nippon Zeon Corporation and 20 parts by mass of aqueous ammonia (concentration: 25.0 mass %) as the PH adjuster with water based on 1000 parts by mass of the total of these components. The contents of the monohydroxybenzene-formaldehyde resin (A), the vinylpyridine-styrene-butadiene copolymer (B), the chlorosulfonated polyethylene (C) and the acrylonitrile-butadiene copolymer (P) in the glass-fiber coating liquid were A/(A+B+C+P)=5.5%, B/(A+B+C+P)=34.5%, C/(A+B+C+P)=10% and P/(A+C+P)=50%, respectively, assuming the total mass of the monohydroxybenzene-formaldehyde resin (A), the chlorosulfonated polyethylene (C) and the acrylonitrile-butadiene copolymer (P) as 100%.

The same secondary glass-fiber coating liquid as that of Reference Example 1 was prepared.

The rubber-reinforcing glass fibers were then produced by applying the primary and secondary coating layers onto the glass fiber cords in the same manner as in Reference Example 1.

(Adhesion Strength Test)

Before addressing the procedure of the adhesion strength evaluation test, an explanation will be given to the heat-resistant rubber materials used in the test.

The heat-resistant rubber materials used in the adhesion strength evaluation test were a heat-resistant cross-linked HNBR rubber (hereinafter referred to as heat-resistant rubber A) prepared from 100 parts by mass of HNBR (available under the product number of 2020 from Zeon Corporation) as a base rubber, 40 parts by mass of carbon black, 5 parts by mass of hydrozincite, 0.5 parts by mass of stearic acid, 0.4 parts by mass of sulfur, 2.5 parts by mass of a vulcanization accelerator and 1.5 parts by mass of an antioxidant and a heat-resistant rubber (hereinafter referred to as heat-resistant rubber B) prepared from 100 parts by mass of HNBR (available under the product number of 2010 from Zeon Corporation) as a base rubber, 40 parts by mass of carbon black, 5 parts by mass of hydrozincite, 0.5 parts by mass of stearic acid, 5 parts by mass of 1,3-di(t-buthylperoxyisopropyl)benzene and 1.5 parts by mass of an antioxidant.

Next, the procedure of the adhesion strength evaluation test will be explained below.

The heat-resistant rubbers A and B were formed into sheets of 3 mm thickness and 25 mm width. Twenty pieces of the rubber-reinforcing glass fiber cords (Reference Examples 1-10, Examples 1-5 and Comparative Examples 1-3) were placed on each of the sheets of the heat-resistant rubbers A and B and covered with cloths, followed by pressing the rubber sheets except their edges with 196 Newton/cm² of pressure (hereinafter the term "Newton" is abbreviated as N) at a temperature of 150° C. in the case of the heat-resistant rubber A and with 196 N/cm² of pressure at a temperature of 170° C. in the case of the heat-resistant rubber B. In this way, the rubber sheets were subjected to vulcanization forming for 30 minute and completed as the test samples for the adhesion strength evaluation test. The adhesion strength of each of the test samples was evaluated by clamping the edge of the test sample and the rubber-reinforcing glass fiber independently, peeling the rubber-reinforcing glass fiber from the rubber sheet at a peel speed of 50 mm/min and determining the maximum resistance of the rubber-reinforcing glass fiber to peeling from the rubber sheet. Herein, higher peel strength means better adhesion strength.

The results of the adhesion strength evaluation test are indicated in TABLE 1. In TABLE 1, the fracture condition of the test sample under which there was no interfacial separation between the glass fiber and the rubber is referred to as "rubber fracture" and the fracture condition of the test sample under which there was separation in at least part of the interface between the glass fiber and the rubber is referred to as "interfacial separation". The occurrence of rubber fracture means higher adhesion strength than the occurrence of interfacial separation.

TABLE 1

| | Adhesion Properties | | | |
|---|---|---|---|---|
| | Heat-resistant Rubber A | | Heat-resistant Rubber B | |
| | Peel Strength (N) | Peeling Condition | Peel Strength (N) | Peeling Condition |
| Example 1 | 312 | rubber fracture | 298 | rubber fracture |
| Example 2 | 302 | rubber fracture | 315 | rubber fracture |
| Example 3 | 335 | rubber fracture | 321 | rubber fracture |
| Example 4 | 300 | rubber fracture | 312 | rubber fracture |
| Example 5 | 321 | rubber fracture | 315 | rubber fracture |
| Reference Example 1 | 314 | rubber fracture | 284 | rubber fracture |
| Reference Example 2 | 333 | rubber fracture | 304 | rubber fracture |
| Reference Example 3 | 323 | rubber fracture | 309 | rubber fracture |
| Reference Example 4 | 343 | rubber fracture | 345 | rubber fracture |
| Reference Example 5 | 313 | rubber fracture | 305 | rubber fracture |
| Reference Example 6 | 325 | rubber fracture | 312 | rubber fracture |
| Reference Example 7 | 333 | rubber fracture | 352 | rubber fracture |
| Reference Example 8 | 314 | rubber fracture | 323 | rubber fracture |
| Reference Example 9 | 294 | rubber fracture | 127 | interfacial separation |
| Reference Example 10 | 319 | rubber fracture | 118 | interfacial separation |
| Comparative Example 1 | 323 | rubber fracture | 314 | rubber fracture |
| Comparative Example 2 | 311 | rubber fracture | 289 | rubber fracture |
| Comparative Example 3 | 321 | rubber fracture | 306 | rubber fracture |

As indicated in TABLE 1, each of the rubber-reinforcing glass fibers of Examples 1-5 (present invention) had the same level of peel strength as those of Reference Examples 1-10 and Comparative Examples 1-3. Further, the fracture conditions of the rubber-reinforcing glass fibers of Examples 1-5 (present invention) were determined as rubber fracture in both the cases of using the heat-resistant rubber A and the heat-resistant rubber B as indicated in TABLE 1. It is thus apparent that the rubber-reinforcing glass fibers of Examples 1-5 (present invention) had good adhesion to both of the heat-resistant rubbers A and B.

(Water Resistance Test)

The transmission belts were produced with a width of 19 mm and a length of 876 mm using the rubber-reinforcing glass fibers of Examples 1-5, Reference Examples 1-10 and Comparative Examples 1-3 as the reinforcements and the heat-resistant rubber B as the base rubber material and was tested for their water resistance by the water-resistance running fatigue test. The water resistance of the transmission belt was evaluated in terms of the tensile strength maintenance, i.e., the water-resistance running fatigue as measured after running the transmission belt on gearwheels i.e. pulleys under wet conditions for a predetermined time.

FIG. 1 is a perspective sectional view of the transmission belts produced by embedding the rubber-reinforcing glass fibers in the heat-resistant rubbers.

The transmission belt 1 had a plurality of projections 1A of 3.2 mm height for engagement with the pulleys, a base portion 1B of 2.0 mm thickness excluding the height of the projections 1A and twelve rubber-reinforcing glass fibers (rubber-reinforcing glass fiber cords) 2 with six S-twist fibers and six Z-twist fibers of opposite initial and final twist directions embedded alternately in the base portion 1B as shown by the section of FIG. 1.

Figure 2:
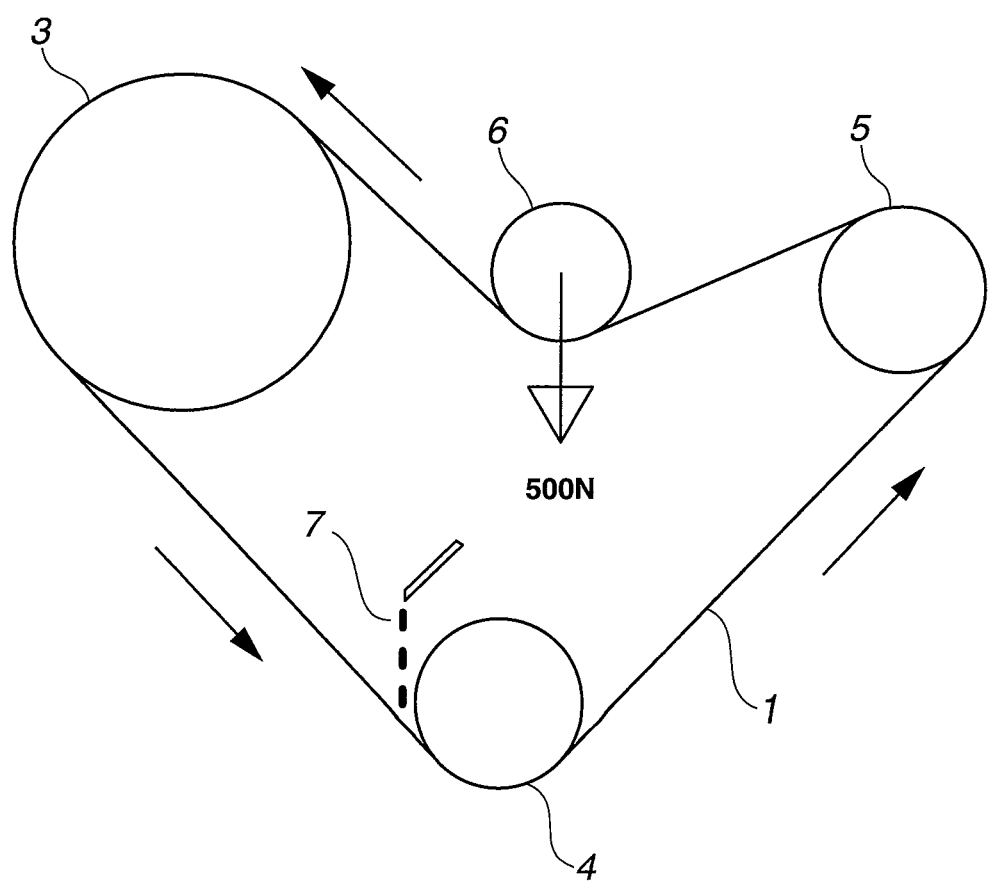
FIG. 2 is a schematic view of a water-resistance running fatigue tester for performance evaluation of the transmission belt.

FIG. 2 is a schematic view of a water-resistance running fatigue tester for the transmission belts.

The belt water resistance was tested by setting the transmission belt 1 in the water-resistance running fatigue tester as shown in FIG. 2 with a drive motor and a generator (not shown in the drawings).

The drive pulley 3 was connected to and rotated by the drive motor to run the transmission belt 1 with rotation of the driven pulleys 4 and 5. The driven pulley 5 was connected to the generator (not shown) to drive the generator in such a manner as to produce 1 kw of power. The idler 6 was rotated during the water-resistance running fatigue test to apply a load of 500 N to the transmission belt 1 and thereby hold the transmission belt 1 under tension. The drive pulley 3 had a diameter of 120 mm and 40 teeth (T), whereas the driven pulleys 4 and 5 had a diameter of 60 mm and 20 teeth (T). The rotation rate of the drive pulley 3 per minute in the water-resistance running fatigue test was 3000 rpm, and the rotation rate of the driven pulleys 4 and 5 per minute in the water-resistance running fatigue test was 6000 rpm. Herein, arrows in parallel with the transmission belt 1 in the drawing indicate the belt running direction.

As shown in FIG. 2, the transmission belt 1 was run with the driven pulleys 4 and 5 and the idler 6 at room temperature by rotating the drive pulley 3 at 3000 rpm and dropping 6000 ml of water 7 per hour uniformly onto the transmission belt 1 at a location between the drive pulley 3 and the driven pulley 4. In the water-resistance running fatigue test, the transmission belt 1 was run for 36 hours as explained above. The tensile strength of the transmission belt 1 was measured before and after the water-resistance running fatigue test to determine the tensile strength maintenance of the transmission belt 1 before and after the test according to the following mathematical expression 1. The water resistance of the transmission belts 1 provided with the rubber-reinforcing glass fibers 2 of Examples 1-5, Reference Examples 1-10 and Comparative Examples 1-3 were compared and evaluated based on the test results.

For tensile strength measurements, three test samples of 257 mm length were cut from a single transmission belt. Each of the test samples was held at its edges by clamps with a clamp-to-clamp distance of 145 mm and pulled at 50 mm/min, thereby measuring the maximum resistance of the belt to breaking. The resistance was measured three times on each belt. The average of the measured resistance values was determined as the tensile strength of the transmission belt after the test. The tensile strength of the transmission belt before the test was determined by measuring the belt resistance three times on each of ten belts and setting the initial tensile strength value to the average of the measured resistance values. The tensile strength maintenance was determined from the tensile strength values by the following equation: Tensile Strength Maintenance (%)=(Tensile Strength after Test)÷(Tensile Strength before Test)×100. The tensile strength maintenance determination results are indicated in TABLE 2.

TABLE 2

|  | Tensile Strength Maintenance (%) |
|---|---|
| Example 1 | 63 |
| Example 2 | 65 |
| Example 3 | 66 |
| Example 4 | 58 |
| Example 5 | 50 |
| Reference Example 1 | 56 |
| Reference Example 2 | 61 |
| Reference Example 3 | 63 |
| Reference Example 4 | 63 |
| Reference Example 5 | 58 |
| Reference Example 6 | 59 |
| Reference Example 7 | 63 |
| Reference Example 8 | 54 |
| Reference Example 9 | 39 |
| Reference Example 10 | 51 |
| Comparative Example 1 | 47 |
| Comparative Example 2 | 61 |
| Comparative Example 3 | 60 |

As shown in TABLE 2, each of the transmission belts with the rubber-reinforcing glass fibers of Examples 1-5 (present invention) had the same level of tensile strength maintenance as those using the rubber-reinforcing glass fibers of Reference Examples 1-10 and Comparative Examples 1-3. It is thus apparent that the rubber-reinforcing glass fibers of Examples 1-5 (present invention) had high water resistance.

(Heat Resistance Test)

The transmission belts was produced with a width of 19 mm and a length of 876 mm using the rubber-reinforcing glass fibers of Examples 1-5, Reference Examples 1-10 and Comparative Examples 1-3 as the reinforcements and the heat-resistant rubber B as the base rubber material and were then subjected to heat-resistance and flexion-resistance running fatigue test for heat resistance evaluations. The heat resistance of the transmission belt was evaluated in terms of the tensile strength maintenance, i.e., the water-resistance running fatigue as measured after running the transmission belt on gearwheels i.e. pulleys under high-temperature conditions for a predetermined time.

Figure 3:
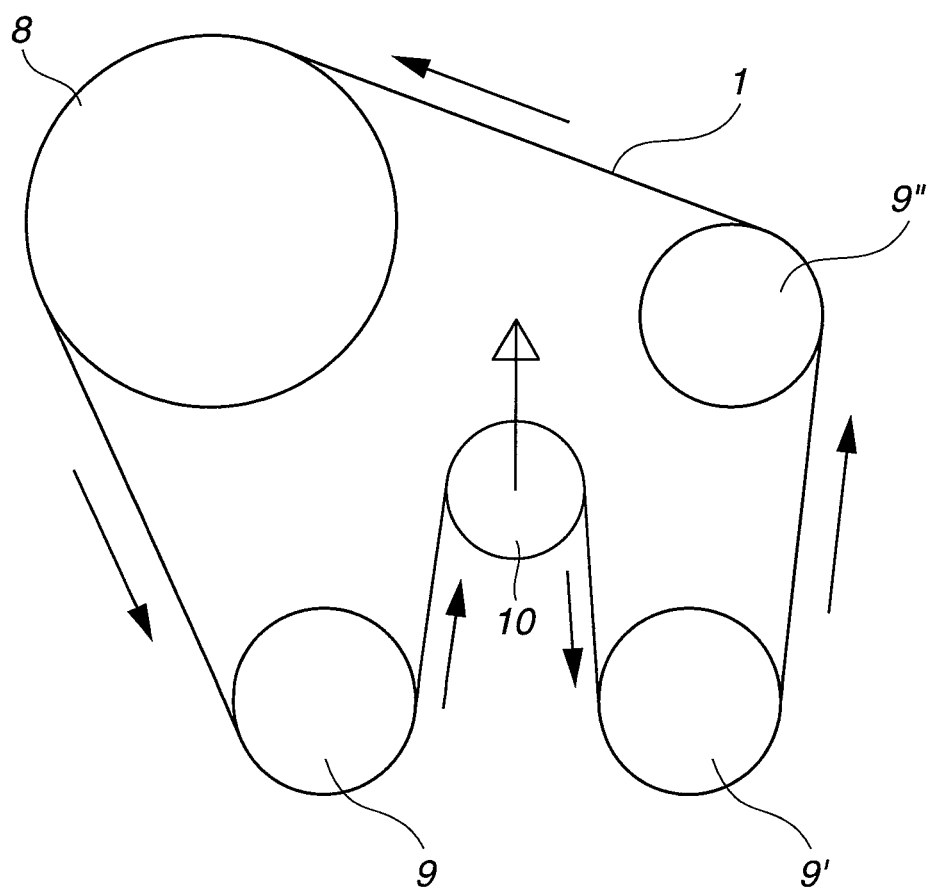
FIG. 3 is a schematic view of a heat-resistance and flexion-resistance running fatigue tester for performance evaluation of the transmission belt.

FIG. 3 is a schematic view of a heat-resistance and flexion-resistance running fatigue tester for the transmission belts.

The belt heat resistance was tested by setting the transmission belt 1 in the heat-resistance and flexion-resistance running fatigue tester as shown in FIG. 3 with a drive motor (not shown in the drawing). The drive pulley 8 was rotated by the drive motor to run the transmission belt 1 with rotation of three driven pulleys 9, 9' and 9". The idler 10 was rotated during the heat-resistance and flexion-resistance running fatigue test to apply a load of 500 N to the transmission belt 1 and thereby hold the transmission belt 1 under tension. The drive pulley 8 had a diameter of 120 mm and 40 teeth (T), whereas the driven pulleys 9, 9' and 9" had a diameter of 60 mm and 20 teeth (T). The rotation rate of the drive pulley 8 per minute in the heat-resistance and flexion-resistance running fatigue test was 3000 rpm, and the rotation rate of the driven pulleys 9, 9' and 9" per minute in the heat-resistance and flexion-resistance running fatigue test was 6000 rpm. Arrows in parallel with the transmission belt 1 in the drawing indicate the belt running direction.

As shown in FIG. 3, the transmission belt 1 was run at a temperature of 130° C. by rotating the drive pulley 8 at 3000 rpm and bending the belt 1 with the driven pulleys 9, 9' and 9" and the idler 10. In the heat-resistance and flexion-resistance running fatigue test, the transmission belt 1 was run for 500 hours as explained above. The tensile strength of the transmission belt 1 was measured before and after the heat-resistance and flexion-resistance running fatigue test to determine the tensile strength maintenance of the transmission belt 1 before and after the test according to the mathematical expression 1. The heat resistance of the transmission belts 1 provided with the rubber-reinforcing glass fibers 2 of Examples 1-5, Reference Examples 1-10 and Comparative Examples 1-2 were compared and evaluated based on the test results. The tensile strength maintenance determination results are indicated in TABLE 3.

TABLE 3

|  | Tensile Strength Maintenance (%) |
|---|---|
| Example 1 | 92 |
| Example 2 | 91 |
| Example 3 | 95 |
| Example 4 | 90 |
| Example 5 | 91 |
| Reference Example 1 | 91 |
| Reference Example 2 | 91 |
| Reference Example 3 | 90 |

TABLE 3-continued

|  | Tensile Strength Maintenance (%) |
| --- | --- |
| Reference Example 4 | 93 |
| Reference Example 5 | 95 |
| Reference Example 6 | 92 |
| Reference Example 7 | 92 |
| Reference Example 8 | 93 |
| Reference Example 9 | 80 |
| Reference Example 10 | 83 |
| Comparative Example 1 | 90 |
| Comparative Example 2 | 92 |
| Comparative Example 3 | 91 |

As shown in TABLE 3, each of the transmission belts with the rubber-reinforcing glass fibers of Examples 1-5 (present invention) had the same level of tensile strength maintenance as those of Reference Examples 1-10 and Comparative Examples 1-3. It is thus apparent that the rubber-reinforcing glass fibers of Examples 1-5 (present invention) had high heat resistance.

(Oil Absorption Test)

The film samples were formed by placing and drying 500 g of each of the glass-fiber coating liquids of Examples 1-5, Reference Examples 1-10 and Comparative Examples 1 to 3 in a container of Teflon (trade name). Each of the film samples was subjected to pressing with 30 kgf/cm$^2$ at 140° C. for 15 minutes and immersed in an oil at 150° C. for 200 hours. The mass of the film sample was measured before and after the immersion. Then, the oil absorption rate of the film sample was determined by the following equation: Oil Absorption Rate=(Film Mass after Immersion−Film Mass before Immersion)÷(Film Mass before Immersion)×100. The oil resistance of the film sample was evaluated based on the oil absorption rate. The oil resistance evaluation results are indicated in TABLE 3.

TABLE 4

|  | Oil Absorption Rate (%) after Immersion in Oil for 200 h | Oil Resistance |
| --- | --- | --- |
| Example 1 | 27 | ○ |
| Example 2 | 43 | ○ |
| Example 3 | 36 | ○ |
| Example 4 | 22 | ○ |
| Example 5 | 50 | Δ |
| Reference Example 1 | 152 | X |
| Reference Example 2 | 161 | X |
| Reference Example 3 | 145 | X |
| Reference Example 4 | 159 | X |
| Reference Example 5 | 161 | X |
| Reference Example 6 | 161 | X |
| Reference Example 7 | 161 | X |
| Reference Example 8 | 161 | X |
| Reference Example 9 | 152 | X |
| Reference Example 10 | 145 | X |
| Comparative Example 1 | 210 | X |
| Comparative Example 2 | 89 | X |
| Comparative Example 3 | 160 | X |

As shown in TABLE 4, each of the films of the glass-fiber coating liquids of Examples 1-5 (present invention) had a much lower oil absorption rate and was less likely to absorb oil as compared to those of Reference Examples 1-10 and Comparative Examples 1-3. It is thus apparent that the rubber-reinforcing glass fibers of Examples 1-5 (present invention) had high oil resistance.

(MIT Bending Test)

For the MIT bending test, the test samples were produced using the rubber-reinforcing glass fibers of Examples 1-5, Reference Examples 1-10 and Comparative Examples 1-3 as the reinforcements and the above-mentioned heat-resistant rubber A as the base rubber material.

Figure 4:
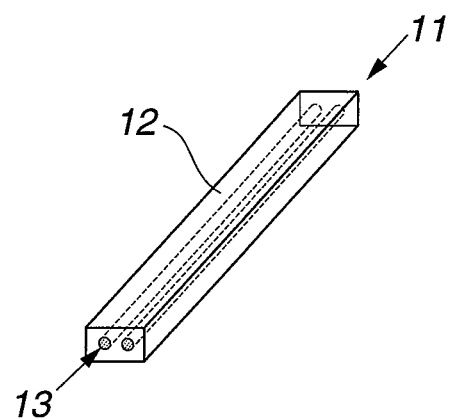
FIG. 4 is a schematic view of a test sample used in MIT bending test.

FIG. 4 is a schematic view of the test sample 11 for the MIT bending test. As shown in FIG. 4, the test sample 11 was 20 mm in height, 50 mm in width and 250 mm in length and had two rubber-reinforcing glass fibers 13 embedded in the HNBR (base rubber material) 12.

The test samples 11 were tested for the water resistance, heat resistance and oil resistance by the MIT bending test.

Figure 5:
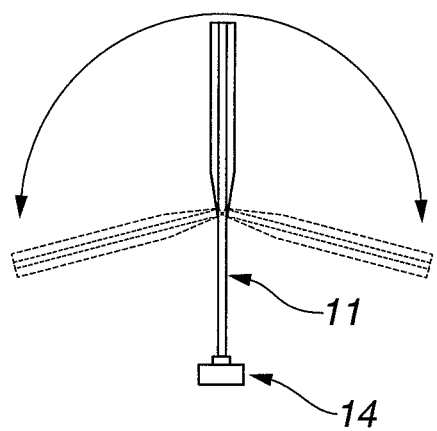
FIG. 5 is a schematic view showing the procedure of the MIT bending test.

FIG. 5 is a schematic view showing the procedure of the MIT bending test. As shown in FIG. 5, the MIT bending test was performed by mounting the test sample 11 to a clamp, fixing a weight 14 of 3 kg to the test sample 11 and bending the test sample 11 1200 times under the conditions of a clamp bending angle of 210 degrees and a speed of 120 times/min.

For the test of the water resistance, the test sample 11 was immersed in water in a beaker, boiled for 2 hours by heating the beaker with a burner, taken out of the beaker, wiped to remove the water, and then, subjected to the MIT bending test. After the MIT bending test, the tensile strength of the test sample 11 was measured.

For the test of the heat resistance, the test sample 11 was heated at 150° C. in a heating furnace for 240 hours, retuned to room temperature, and then, subjected to the MIT bending test. After the MIT bending test, the tensile strength of the test sample 11 was measured.

For the test of the oil resistance, the test sample 11 was immersed in an automotive engine oil heated to 120° C. for 100 hours, taken out of the engine oil, wiped to remove the engine oil, and then, subjected to the MIT bending test. After the MIT bending test, the tensile strength of the test sample 11 was measured.

The tensile strength maintenance was determined from the measured tensile strength values by the following equation: Tensile Strength Maintenance (%)=(Tensile Strength after Test)÷(Tensile Strength before Test)×100. The tensile strength maintenance determination results are indicated in TABLE 5. The higher the tensile strength maintenance, the higher the resistance to water, heat or oil.

TABLE 5

|  | Tensile Strength Maintenance (%) | | |
| --- | --- | --- | --- |
|  | Heat Resistance | Water Resistance | Oil Resistance |
| Example 1 | 35 | 91 | 91 |
| Example 2 | 34 | 93 | 88 |
| Example 3 | 39 | 91 | 89 |
| Example 4 | 32 | 90 | 86 |
| Example 5 | 33 | 61 | 79 |
| Reference Example 1 | 33 | 88 | 43 |
| Reference Example 2 | 34 | 80 | 43 |
| Reference Example 3 | 31 | 88 | 39 |
| Reference Example 4 | 35 | 91 | 45 |
| Reference Example 5 | 34 | 90 | 44 |
| Reference Example 6 | 32 | 89 | 46 |
| Reference Example 7 | 32 | 88 | 40 |
| Reference Example 8 | 35 | 90 | 50 |
| Reference Example 9 | 36 | 89 | 52 |
| Reference Example 10 | 33 | 90 | 49 |
| Comparative Example 1 | 22 | 75 | 38 |
| Comparative Example 2 | 39 | 82 | 56 |
| Comparative Example 3 | 39 | 76 | 46 |

As to each of the heat resistance and water resistance, the test samples using the rubber-reinforcing glass fibers of Examples 1-5 (present invention) had the same level of tensile strength maintenance as those using the rubber-reinforcing glass fibers of Reference Examples 1-10 and Comparative Examples 1-3 as shown in TABLE 5. As to the oil resistance, on the other hand, the test samples using the rubber-reinforcing glass fibers of Examples 1-5 (present invention) had the same level of tensile strength maintenance as those using the rubber-reinforcing glass fibers of Reference Examples 1-10 and Comparative Examples 1-3 as shown in TABLE 5. It is thus apparent that the rubber-reinforcing glass fibers of Examples 1-5 (present invention) had not only high water resistance and heat resistance but also high oil resistance.

It has been shown by the above results that: the rubber-reinforcing glass fibers of Examples 1-5 had good adhesion to the cross-liked HNBR material and, when used as the reinforcements in the automotive belts such as timing belt, showed high water resistance, high heat resistance and high oil resistance.

As described above, it is possible according to the present invention to provide the glass-fiber coating liquid such that the coating layer formed of the glass-fiber coating liquid can show good adhesion to the glass fiber cord and the cross-linked HNBR base material. When the rubber-reinforcing glass fiber is produced into the transmission belt by embedding the rubber-reinforcing glass fiber in the cross-linked HNBR material, the thus-obtained timing belt can attain water resistance, heat resistance and oil resistance. The rubber-reinforcing glass fiber is thus suitable for use as a reinforcement of the power transmission belt for any power source e.g. engine and motor, notably an automotive transmission belt such as timing belt, so as to maintain tensile strength and impart dimension stability during use under high-temperature high-humidity conditions in the presence of a lubricating oil.

The invention claimed is:

1. A glass-fiber coating liquid for forming a coating layer on a glass fiber cord, prepared in the form of an emulsion consisting essentially of:
 a monohydroxybenzene-formaldehyde resin (A) obtained by reaction of monohydroxybenzene (D) and formaldehyde (E);
 a vinylpyridine-styrene-butadiene copolymer (B) having a vinylpyridine monomer content of 17 to 35% by mass, a styrene monomer content of 20 to 40% by mass and a butadiene monomer content of 35 to 60% by mass;
 a chlorosulfonated polyethylene (C);
 an acrylonitrile-butadiene rubber (P);
 at least one additive selected from the group consisting of an antioxidant, a pH adjuster and a stabilizer; and
 water.

2. The glass-fiber coating liquid according to claim 1, wherein the monohydroxybenzene-formaldehyde resin (A), the vinylpyridine-styrene-butadiene copolymer (B), the chlorosulfonated polyethylene (C) and the acrylonitrile-butadiene rubber (P) are contained in amounts of 3 to 8% by mass, 30 to 60% by mass, 8 to 15% by mass and 25 to 60% by mass, respectively, based on the total mass of the monohydroxybenzene-formaldehyde resin (A), the vinylpyridine-styrene-butadiene copolymer (B), the chlorosulfonated polyethylene (C) and the acrylonitrile-butadiene rubber (P).

3. The glass-fiber coating liquid according to claim 1, wherein the monohydroxybenzene-formaldehyde resin (A) is a resol resin obtained by reaction of the monohydroxybenzene (D) and the formaldehyde (E) in the presence of a base catalyst at a mole ratio of the formaldehyde (E) to the monohydroxybenzene (D) of E/D=0.5 to 3.0.

4. A glass-fiber coating liquid for forming a coating layer on a glass fiber cord, prepared in the form of an emulsion consisting essentially of:
 a monohydroxybenzene-formaldehyde resin (A) obtained by reaction of monohydroxybenzene (D) and formaldehyde (E);
 a vinylpyridine-styrene-butadiene copolymer (B) having a vinylpyridine monomer content of 17 to 35% by mass, a styrene monomer content of 20 to 40% by mass and a butadiene monomer content of 35 to 60% by mass;
 a chlorosulfonated polyethylene (C);
 an acrylonitrile-butadiene rubber (P);
 a styrene-butadiene copolymer (F);
 at least one additive selected from the group consisting of an antioxidant, a pH adjuster and a stabilizer; and
 water.

5. A rubber-reinforcing glass fiber, comprising:
 a glass fiber cord;
 a primary coating layer formed by applying and drying the glass-fiber coating liquid according to claim 1 on the glass fiber cord; and
 a secondary coating layer formed by applying a secondary glass-fiber coating liquid on said coating layer.

6. The rubber-reinforcing glass fiber according to claim 5, wherein the secondary glass-fiber coating liquid contains an organic solvent, a halogen-containing polymer (G) and a bis-allylnagiimide (H).

7. The rubber-reinforcing glass fiber according to claim 5, wherein the secondary glass-fiber coating liquid contains an organic solvent, a halogen-containing polymer (G), zinc methacrylate (I) and an organic diisocyanate (J).

8. The rubber-reinforcing glass fiber according to claim 5, wherein the secondary glass-fiber coating liquid contains an organic solvent, a halogen-containing polymer (G) and a maleimide (K).

9. The rubber-reinforcing glass fiber according to claim 5, wherein the secondary glass-fiber coating liquid contains an organic solvent, a halogen-containing polymer (G) and a triazine compound (M).

10. A transmission belt, comprising:
 a base rubber material; and
 the rubber-reinforcing glass fiber according to claim 5 embedded in the base rubber material.

* * * * *